(12) United States Patent
Bech

(10) Patent No.: US 11,015,573 B2
(45) Date of Patent: May 25, 2021

(54) CONNECTION JOINT FOR A SECTIONAL WIND TURBINE ROTOR BLADE AND ASSOCIATED METHODS

(71) Applicant: Vestas Wind Systems A/S, Aarhus N. (DK)

(72) Inventor: Anton Bech, Ciudad Real (ES)

(73) Assignee: Vestas Wind Systems A/S, Aarhus N. (DK)

(*) Notice: Subject to any disclaimer, the term of this patent is extended or adjusted under 35 U.S.C. 154(b) by 81 days.

(21) Appl. No.: 16/473,781

(22) PCT Filed: Dec. 19, 2017

(86) PCT No.: PCT/DK2017/050441
§ 371 (c)(1),
(2) Date: Jun. 26, 2019

(87) PCT Pub. No.: WO2018/121826
PCT Pub. Date: Jul. 5, 2018

(65) Prior Publication Data
US 2019/0338750 A1 Nov. 7, 2019

(30) Foreign Application Priority Data
Dec. 28, 2016 (DK) .......................... PA 2016 71057

(51) Int. Cl.
*F03D 1/06* (2006.01)
*B29C 70/48* (2006.01)
(Continued)

(52) U.S. Cl.
CPC ............ *F03D 1/0675* (2013.01); *B29C 70/48* (2013.01); *B29C 70/72* (2013.01);
(Continued)

(58) Field of Classification Search
CPC ....... F03D 1/0675; B29C 70/48; B29C 70/72; B29K 2063/00; B29K 2307/04;
(Continued)

(56) References Cited

U.S. PATENT DOCUMENTS 5,263,516 A 11/1993 van Schuylenburch
7,891,947 B2 2/2011 Chen et al.
(Continued)

FOREIGN PATENT DOCUMENTS

CN 1957178 A 5/2007
CN 101876292 A 11/2010
(Continued)

OTHER PUBLICATIONS

China National Intellectual Property Administration, First Notification of Office Action in CN Application No. 201780085901.7, dated Jun. 24, 2020.
(Continued)

*Primary Examiner* — Igor Kershteyn

(57) ABSTRACT

A wind turbine blade includes a first blade section and a second blade section configured to be coupled together at a joint interface. The blade further includes a connection joint for coupling the first and second blade sections together. The connection joint includes a plurality of connecting elements integrated into the first and second blade sections at the first and second blade interfaces. The connection joint further includes cross pins and fasteners for making the connection. A method of making a wind turbine blade section and a wind turbine blade made from such sections are also disclosed.

29 Claims, 20 Drawing Sheets

(51) Int. Cl.
*B29C 70/72* (2006.01)
*B29K 63/00* (2006.01)
*B29K 307/04* (2006.01)
*B29K 309/08* (2006.01)
*B29L 31/08* (2006.01)

(52) U.S. Cl.
CPC ...... *B29K 2063/00* (2013.01); *B29K 2307/04* (2013.01); *B29K 2309/08* (2013.01); *B29L 2031/085* (2013.01); *F05B 2230/20* (2013.01); *F05B 2230/60* (2013.01); *F05B 2240/221* (2013.01); *F05B 2240/302* (2013.01); *F05B 2250/11* (2013.01); *F05B 2280/6013* (2013.01); *F05B 2280/6015* (2013.01)

(58) Field of Classification Search
CPC ........... B29K 2309/08; B29L 2031/085; F05B 2230/20; F05B 2230/60; F05B 2240/211; F05B 2240/302; F05B 2250/11; F05B 2280/6013; F05B 2280/6015; Y02P 70/50; Y02E 10/72
See application file for complete search history.

(56) References Cited

U.S. PATENT DOCUMENTS

| | | | | |
|---|---|---|---|---|
| 7,901,188 | B2* | 3/2011 | Llorente Gonzalez | F03D 1/0675 416/228 |
| 8,510,947 | B2* | 8/2013 | Kirkpatrick | F03D 1/0675 29/889.71 |
| 8,662,853 | B2 | 3/2014 | Vasudeva et al. | |
| 2003/0138290 | A1* | 7/2003 | Wobben | F16B 5/0008 403/293 |
| 2008/0069699 | A1* | 3/2008 | Bech | B29C 66/721 416/229 R |
| 2009/0311106 | A1 | 12/2009 | Rohden | |
| 2016/0040651 | A1 | 2/2016 | Yarbrough et al. | |

FOREIGN PATENT DOCUMENTS

| | | |
|---|---|---|
| CN | 201679648 U | 12/2010 |
| CN | 202162376 U | 3/2012 |
| DE | 4127431 C2 | 10/1994 |
| EP | 0474090 A1 | 3/1992 |
| EP | 1244873 B1 | 4/2004 |
| EP | 1584817 A1 | 10/2005 |
| EP | 1950414 A2 | 7/2008 |
| EP | 2746574 A2 | 6/2014 |
| EP | 2881580 A1 | 6/2015 |
| EP | 2930350 A1 | 10/2015 |

OTHER PUBLICATIONS

European Patent Office, International Search Report and Written Opinion in PCT Application No. PCT/DK2017/050441, dated Mar. 26, 2018.

Danish Patent and Trademark Office, Search and Examination Report in PA 2016 71057, dated Jun. 13, 2017.

* cited by examiner

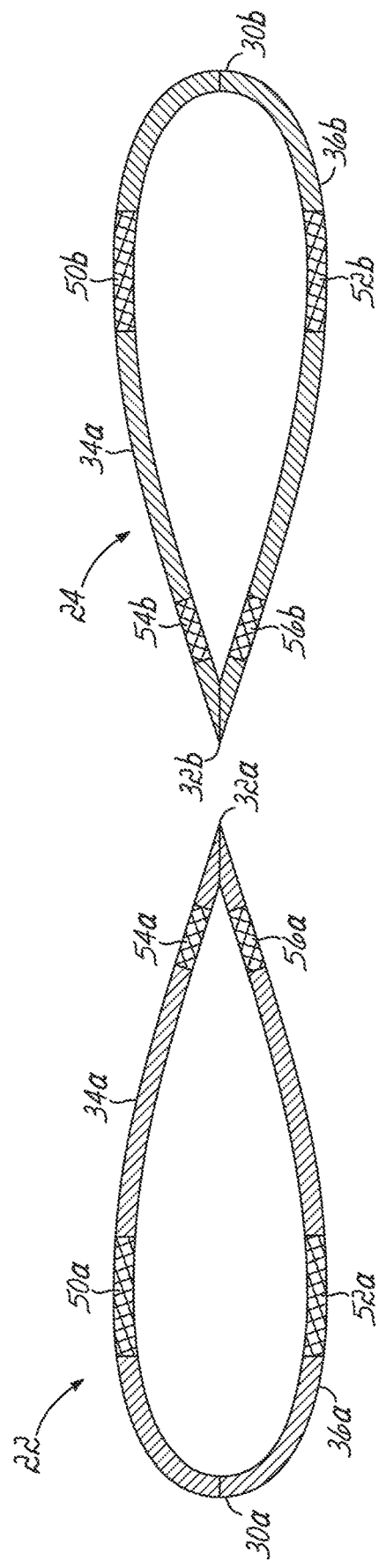

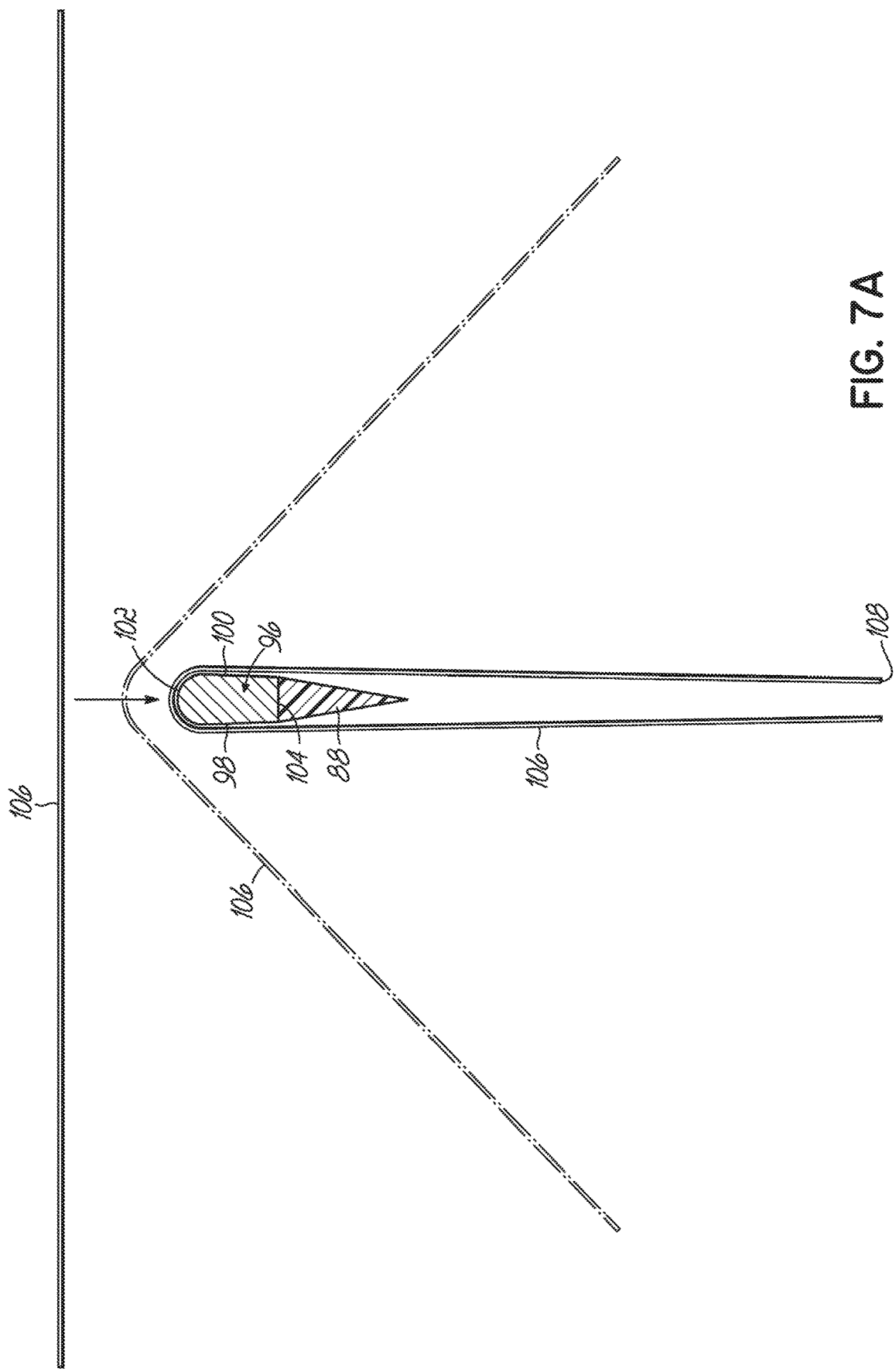

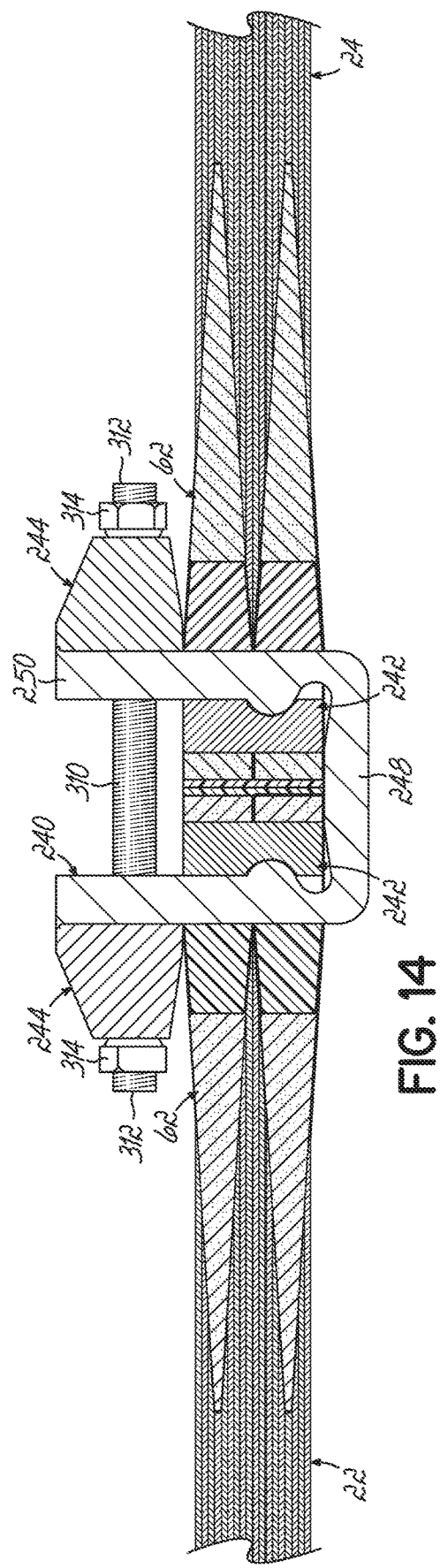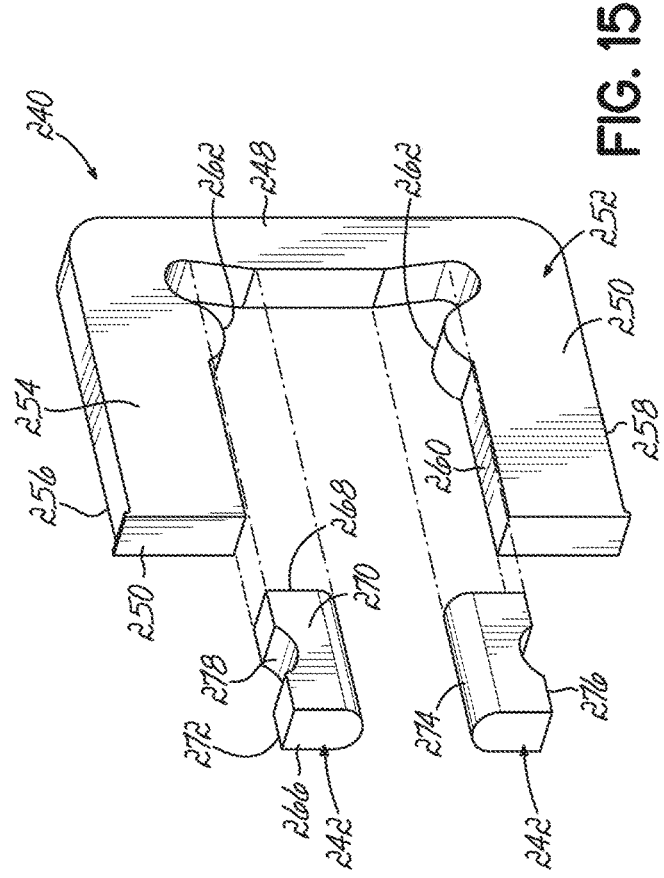

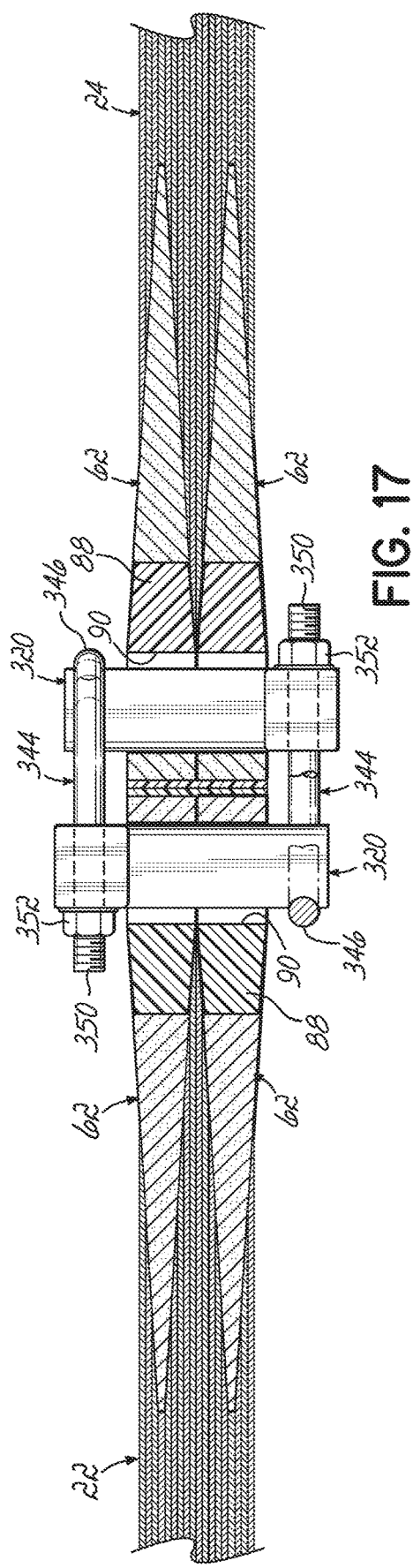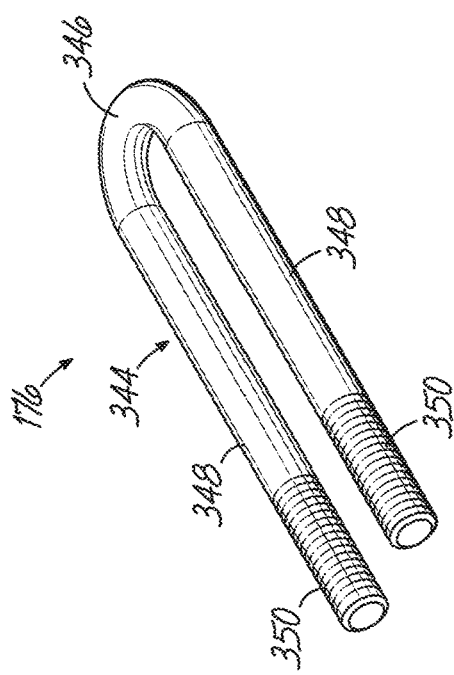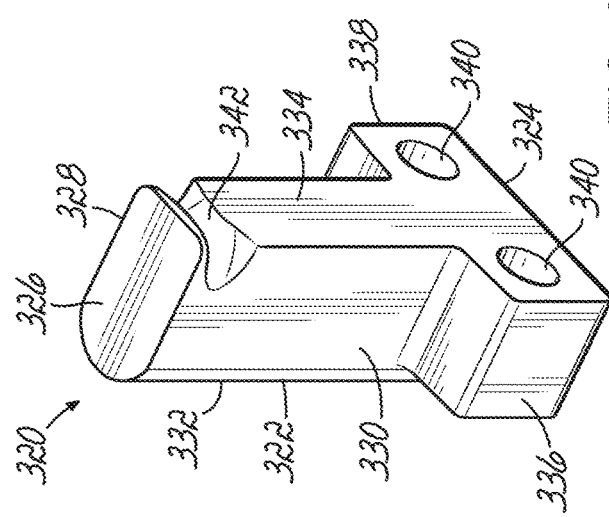

CONNECTION JOINT FOR A SECTIONAL WIND TURBINE ROTOR BLADE AND ASSOCIATED METHODS

TECHNICAL FIELD

The invention relates generally to wind turbines, and more particularly to an improved connection joint for connecting adjacent sections of a sectional wind turbine rotor blade, and a method of forming a sectional wind turbine rotor blade having an improved connection joint for connecting the sections of the rotor blade together.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a central hub and a plurality of blades coupled to the hub and extending outwardly therefrom. The rotor is supported on a shaft extending from the nacelle, which shaft is either directly or indirectly operatively coupled with a generator which is housed inside the nacelle. Consequently, as wind forces the blades to rotate, electrical energy is produced by the generator.

Traditional wind turbine blades include an outer shell positioned about an inner structural support. The outer shell typically includes upper and lower shell halves that mate together at corresponding edges to define an aerodynamic cross sectional profile. The outer shell may be appropriately shaped so as to provide the aerodynamic aspects of the wind turbine blade. In a conventional process, the upper and lower shell halves are provided as one-piece structures which may be formed in a moulding process, for example. The inner structural support, which may include one or more spars, is typically positioned in a cavity between the upper and lower shell halves and extends in a longitudinal direction of the blade. The spar provides strength and stiffness to the blade such that the blades may withstand the loads imposed during operation of the wind turbine. The spar generally includes spar caps associated with the upper and lower shells and one or more spar webs that span between the spar caps associated with the upper and lower shells. By way of example, the spar may include a box-shaped tubular element having spar caps engaged with the upper and lower shells and two spar webs extending therebetween. Alternatively, spar caps can be integrated into the formation of the upper and lower shells, such that the spar caps form part of the outer surface of the blades. One or more spar webs then extend between the integrated spar caps to provide structural support to the blade.

In recent years, wind power has become a more attractive alternative energy source and the number of wind turbine, wind farms, etc. has significantly increased, both on land and off-shore. Additionally, the size of wind turbines has also significantly increased, with modern wind turbine blades extending between 50 to 80 meters in length, and is expected to further increase in the future. The increased length in the wind turbine blades has introduced a number of interesting design considerations for wind turbine designers and manufacturers. For example, production facilities, including the physical space as well as the equipment for manufacturing the blades (e.g., moulds, cranes and other handling equipment) must accommodate the increased size of the blades. Additionally, the logistics and transportation of such large blades becomes increasingly difficult as the length of the blades continues to increase. In the end, the production, handling and transportation of large scale wind turbine blades is associated with significant challenges and high costs that may present a practical limit as to the length of wind turbine blade which may be manufactured.

One approach for addressing these issues is to provide a wind turbine blade having two or more sections which are subsequently coupled together to form the complete wind turbine blade. In this approach, each blade section may include an outer shell and an inner spar. The blade sections are then brought together at a joint interface and secured together to form the complete blade. The joint interface, however, must be designed so as to have the necessary strength to be able to safely transfer the loads and moments across the joint from one blade section to the next. One design provides one or more spar extensions from one or both of the blade section interfaces which are insertable into respective spar receivers at the other blade section interface. These elements may then be bonded or otherwise coupled together to form the connection joint between the blade sections. Another design includes a plurality of connectors at the joint interface to provide a positive coupling between the blade sections. To withstand the loads acting, for example, along a mid-span of the blade, however, the connectors may be numerous and sizeable, such that the amount of blade material at the joint interface (and through which the loads must be transferred to the connectors) significantly decreases and raises the possibility of compromising the structural integrity of the blade.

While current connection joints for sectional blade designs are sufficient to achieve their intended purpose, manufacturers continually strive to provide a connection joint for coupling wind turbine blade sections that accommodates increased loading across the joint interface in a cost-effective manner and without sacrificing the structural integrity of the blade in the region of the joint.

SUMMARY

To these and other ends, a wind turbine rotor blade includes a first blade section having an upper shell half and a lower shell half that defines a suction side, pressure side, leading edge, and a trailing edge of the blade, the first blade section further including a first blade interface at one end of the first blade section, and a second blade section having an upper shell half and a lower shell half that defines a suction side, pressure side, leading edge, and a trailing edge of the blade, the second blade section further including a second blade interface at one end of the second blade section, wherein the first blade section and the second blade section are configured to be coupled together at the first and second blade interfaces. The blade further includes a connection joint for coupling the first and second blade sections together. The connection joint includes a plurality of connecting elements integrated into the first and second blade sections at the first and second blade interfaces. Each connecting element includes an eye that defines at least in part a bore that extends from an exterior to an interior of one of the first or second blade sections.

In one embodiment, the wind turbine blade further includes a first spar cap associated with the upper shell half and a second spar cap associated with the lower shell half of each of the first and second blade sections, wherein the plurality of connecting elements are integrated into the first and second spar caps of the first and second blade sections. The spar caps may be integrated into the upper and lower shells such that the spar caps form part of an exterior surface of the first and second blade sections. Moreover, a width of the first and second spar caps increases in a longitudinal direction toward the first and second blade interfaces of the first and second blade sections, respectively. The width of the spar caps is in a chordwise direction, that is the direction between the leading edge and the trailing edge.

Additionally or alternatively, the wind turbine blade may further include a first trailing edge stringer associated with the upper shell half and a second trailing edge stringer associated with the lower shell half of each of the first and second blade sections, wherein the plurality of connecting elements are integrated into the first and second trailing edge stringers of the first and second blade sections. The trailing edge stringers may be integrated into the upper and lower shells such that the trailing edge stringers form part of an exterior surface of the first and second blade sections. The spar caps and/or the trailing edge stringers may be formed from pultruded strips of fiber.

In an exemplary embodiment, each of the plurality of connecting elements includes a folded roving of fibers, wherein the eye of the connecting elements is defined at least in part by the fold in the fiber rovings. More particularly, the folded roving of fibers defines a through hole and an insert may be positioned in the through hole such that a portion of the through hole and a portion of the insert forms a boundary of the eye of the connecting elements. In one embodiment, the roving of fibers may be provided by stacked plies of fiber material. The stack of fiber material plies may primarily include unidirectional fibers. The fibers may include glass fibers, carbon fibers or combinations thereof. In one aspect, at least a portion of the eyes of the plurality of connecting elements is formed by longitudinal side walls of the fiber rovings such that there are substantially no fiber endings at a boundary of the eyes along the portion formed by the fiber rovings.

The connecting elements may be entirely made from non-metallic materials. For example, the connecting elements may be made entirely from a composite material. Additionally, the connecting elements may be wedge shaped in at least one direction. More particularly, the connecting elements may be tapered in two directions, such as in a height direction and a width direction. A head end of the connecting elements may be formed by an arcuate arrangement (e.g., semicircular arrangement) of the fiber rovings. In one embodiment, the first and second blade sections may be a moulded article and the plurality of connecting elements may be integrated into the blade sections during moulding of the blade sections.

The connection joint may further include a plurality of cross pins configured to be received through respective eyes of the plurality of connecting elements which form the bores through the first and second blade sections. When the cross pins are received in the eyes, an exposed portion of the cross pins is configured to extend from at least one of an exterior surface and an interior surface of the first and second blade sections. In one embodiment, when the cross pins are received in the eyes, an exposed portion of the cross pins is configured to extend away from an exterior surface and an interior surface of the blade sections. However, in another embodiment, the cross pins may be configured to extend away from only the exterior surface of the blade sections. The cross pins may include one or more grooves. In one embodiment, the cross pins may include two bosses extending in opposite directions to provide a T-shaped cross pin. Each of the bosses includes a through hole for receiving a fastener. In one embodiment, a plurality of retention heads may be provided, wherein each retention head includes through holes for receiving fasteners and is configured to abut a plurality of cross pins. The cross pins are slidably insertable into the respective eyes of the plurality of connecting elements and are not otherwise fixedly secured to the root end of the rotor blade. Furthermore, in one embodiment the cross pins may include a U-shaped bracket having a base and a pair of legs extending from the base and a pair of shoes. Each leg of the U-shaped bracket includes a raised knuckle and each shoe includes a recess, wherein the shoes are configured to engage with the legs such that the raised knuckle engages with the recess and are pivotable relative to the legs.

The connection joint further includes a plurality of fasteners for securing the first and second blade sections together. The fasteners are configured to engage with an exposed portion of the cross pins when the cross pins are received through respective eyes of the plurality of connecting elements. The fasteners may include U-bolts or stud bolts, for example. The connection joint is configured such that the fasteners extend across the joint interface on one side or the other of the blade sections. Accordingly, none of the fasteners penetrate into the end face of the blade sections at the joint interfaces. The fasteners are orientated in a spanwise direction of the blade, that is in the direction between the root and the tip of the blade. The fasteners may be provided at the interior and/or the exterior of the blade sections. In other words, the fasteners are located outside of the shells of the blade sections.

A method of making a wind turbine rotor blade section includes providing a moulding apparatus having a first mould half and a second mould half, each mould half having a moulding surface; providing a plurality of connecting elements each having an eye; laying a first assembly of fibers in the first and second mould halves of the moulding apparatus; inserting the plurality of connecting elements in the first and second mould halves of the moulding apparatus, wherein the plurality of connecting elements are generally positioned between the first and second assembly of fibers; infusing resin into the first and second assemblies of fibers; curing the fibers and resin to form upper and lower shells of the blade section, wherein the plurality of connecting elements is arranged in the first and second mould halves of the moulding apparatus such that the yes in the connecting elements define bores through the upper and lower shells of the blade section; and coupling the upper and lower shells together to form a blade section that defines a suction side, pressure side, leading edge, and a trailing edge of the blade section, the blade section further including a blade interface that includes the plurality of connecting elements. In one embodiment, laying the first and second assembly of fibers includes laying a first and second assembly of fibers that form a spar cap of the blade section, wherein the plurality of connecting elements are inserted between the assembly of fibers that form the spar cap. Additionally or alternatively, laying the first and second assembly of fibers includes laying a first and second assembly of fibers that form a trailing edge stringer of the blade section, wherein the plurality of connecting elements are inserted between the assembly of fibers that form the trailing edge stringer. The method may further include providing a plurality of anchors in the first and second mould halves of the moulding apparatus, wherein the anchors are coupled to the moulding surface and extend therefrom; and supporting each of the connecting elements on a respective anchor such that the anchors extend through the through holes in the connecting elements. Moreover, the method may further include removing the anchors from the moulding apparatus, and de-moulding the blade section from the moulding apparatus.

In another embodiment, a method of making a wind turbine blade includes forming a first blade section and a second blade section as described above; inserting a plurality of cross pins through the eyes of the connecting elements in the first and second blade sections; and using fasteners to couple exposed portions of the cross pins to each other across a joint interface at which the first and second blade sections meet.

In still another embodiment, a wind turbine includes a tower, a nacelle positioned on the tower, and a rotor coupled to the nacelle and including at least one rotor blade including a first blade section and a second blade section coupled together by a connection joint. The connection joint includes a plurality of connecting elements integrated into the first and second blade section, each connecting element including an eye that defines a bore through the blade section; a plurality of cross pins received through respective eyes of the plurality of connecting elements which form the bores through the blade sections, wherein the cross pins include an exposed portion that extends away from at least one of an external surface and an internal surface of the blade sections; and a plurality of fasteners, each engaging the exposed portion of the cross pins across a joint interface at which the first and second blade sections meeting for securing the first and second blade sections together.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

FIG. 3A is a cross-sectional view of the blade shown in FIG. 3;

FIG. 3B is another cross-sectional view of the blade shown in FIG. 3;

FIGS. 7A-7D schematically illustrate a method for making the connecting element shown in FIGS. 4-6;

FIG. 14 is a cross-sectional view of the connection joint shown in FIGS. 12 and 13;

FIG. 15 illustrates a cross pin for the connection joint shown in FIG. 14;

FIG. 17 is a cross-sectional view of the connection joint shown in FIG. 16;

FIG. 18 illustrates a cross pin for the connection joint shown in FIG. 16; and

FIG. 19 illustrates a fastener for the connection joint shown in FIG. 16.

DETAILED DESCRIPTION

Figure 1:
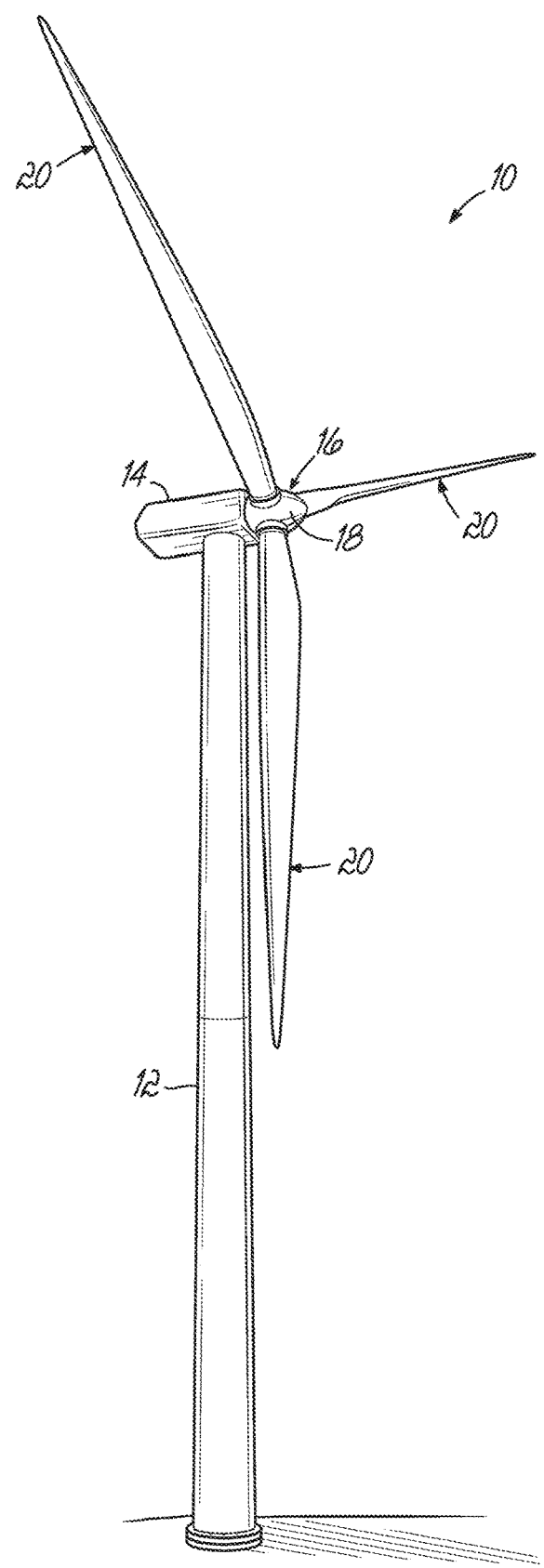
FIG. 1 is a perspective view of a wind turbine in which embodiments of the invention may be used.

With reference to FIG. 1, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a plane substantially perpendicular to the wind direction. The rotor 16 of wind turbine 10 includes a central hub 18 and at least one rotor blade 20 that projects outwardly from the central hub 18 at locations circumferentially distributed thereabout. In the representative embodiment, the rotor 16 includes three blades 20, but the number may vary. The blades 20 are configured to interact with the passing air flow to produce lift that causes the central hub 18 to spin about a central longitudinal axis.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

Figure 2:
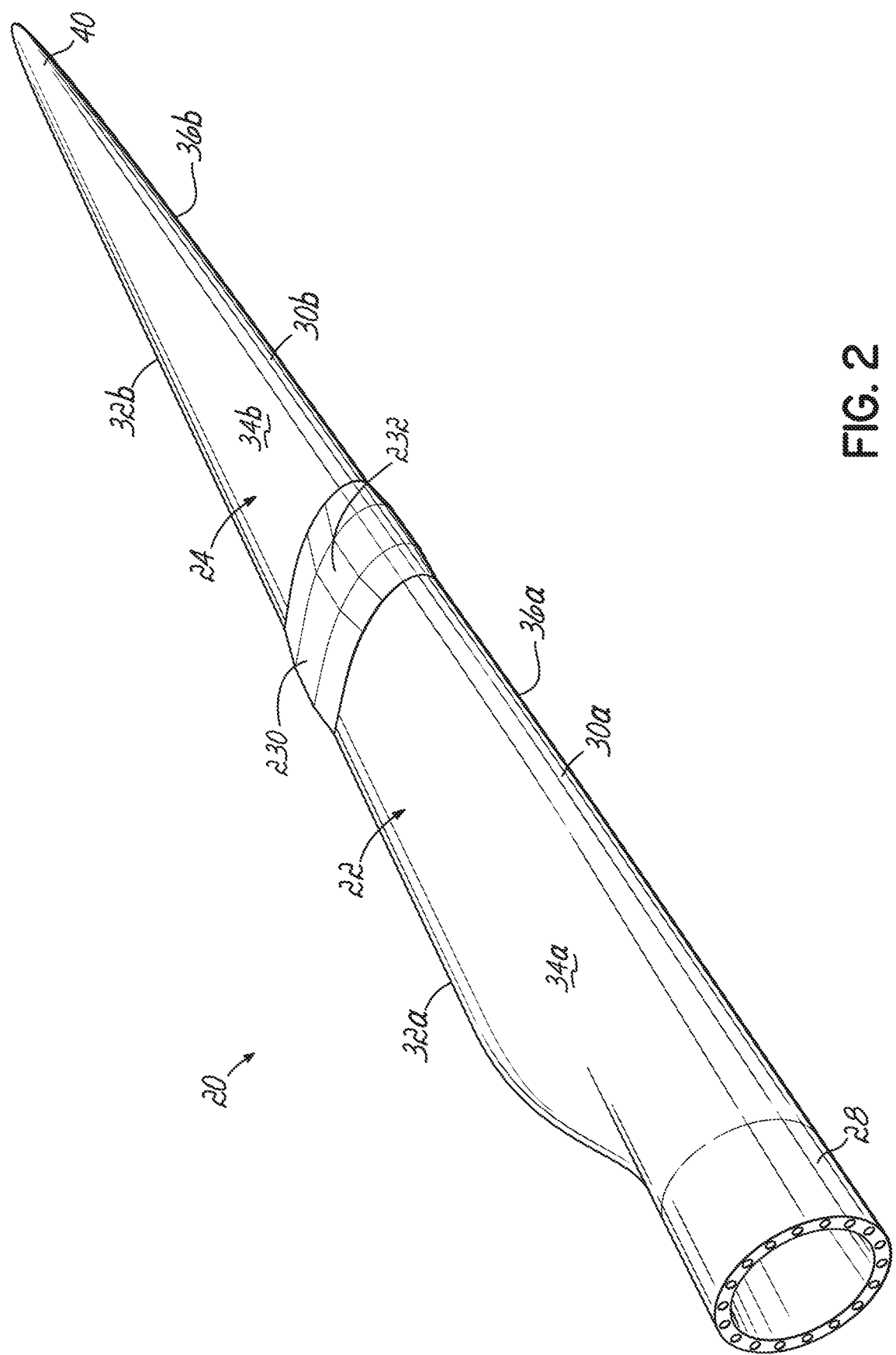
FIG. 2 is a perspective view of a sectional wind turbine blade in accordance with an embodiment of the invention.
Figure 3:
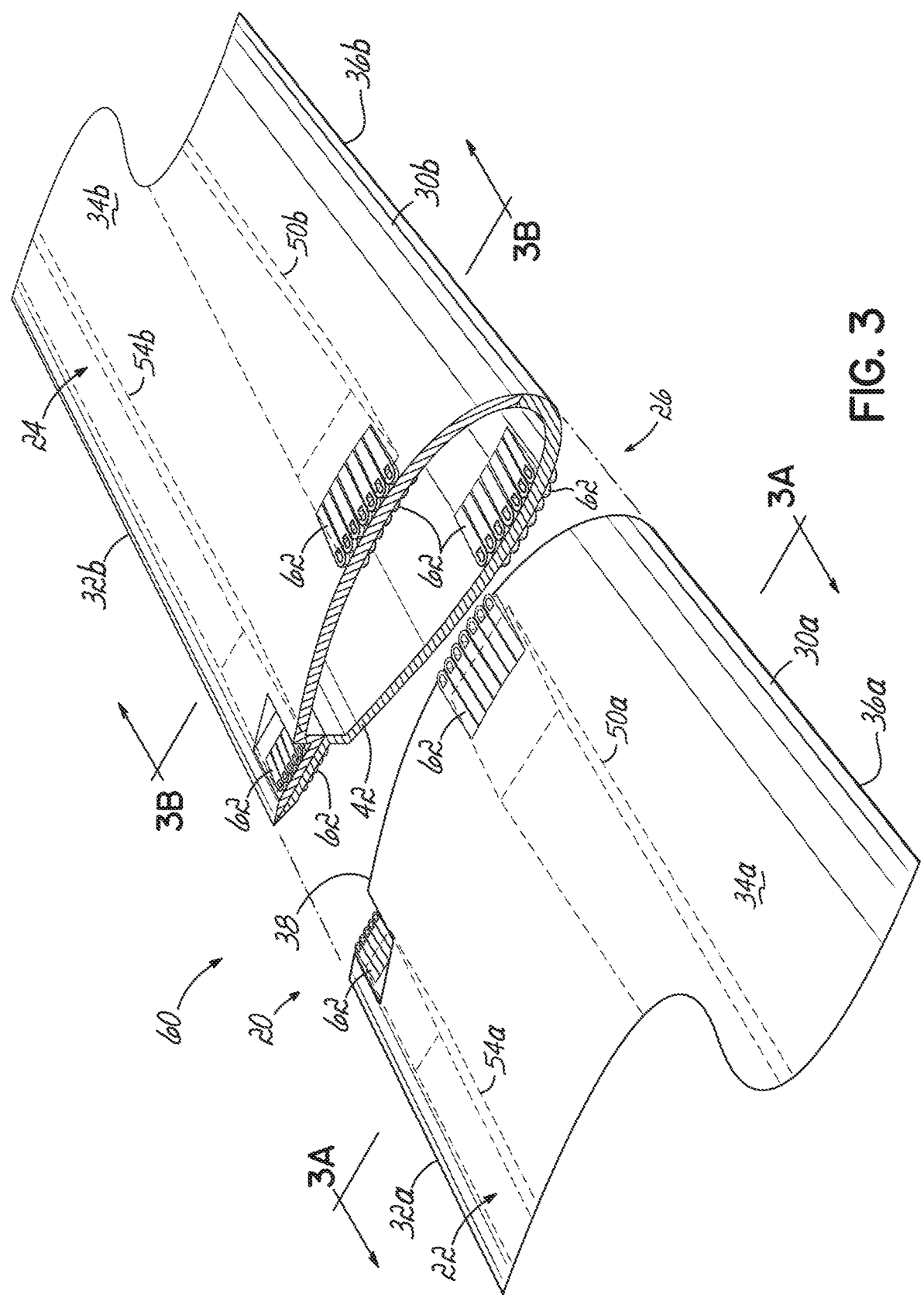
FIG. 3 is a partial perspective view of a sectional wind turbine blade in accordance with an embodiment of the invention.

FIGS. 2 and 3 illustrate a sectional wind turbine blade 20. The wind turbine blade 20 includes a first blade section 22 and a second blade section 24 which are connected to each other at a joint interface 26 to form an assembled blade 20. In an exemplary embodiment, the joint interface 26 may be located at approximately the mid-span of the wind turbine blade 20; however, other positions for a joint interface along the span of the blade 20 are also possible. The first blade section 22 includes a root end 28, a leading edge 30a, a trailing edge 32a, a suction side 34a and a pressure side 36a. The first blade section 22 terminates at a first blade interface 38 opposite to the root end 28. Similarly, and using similar reference numbers, the second blade section 24 includes a tip end 40, a leading edge 30b, a trailing edge 32b, a suction side 34b and a pressure side 36b. The second blade section 24 begins at a second blade interface 42 opposite to the tip end 40. The first blade interface 38 and the second blade interface 42 may be brought together to form the joint interface 26. While FIG. 2 is shown and described as having two blade sections 22, 24 joined at one joint interface 26, it should be recognized that the sectional wind turbine blade 20 may be formed by more than two blade sections with multiple joint interfaces which are connected together in a manner described more fully below to form an assembled blade 20. Accordingly, the invention should not be limited to the specific embodiment shown in FIG. 2.

Forming wind turbine blades in sections does provide certain advantages. For example, since the blade sections are smaller, the production facilities and handling equipment do not have to be as large. In this regard, existing facilities and equipment are most likely sufficient to manufacture large wind turbine blades in multiple sections. Thus, special facilities and equipment do not have to be developed or dedicated to provide blades of increased length. Moreover, the transportation aspects of segmented blades are more manageable and less costly. More particularly, as the blade segments have a manageable size (as compared to the blade as a whole), the transportation of blade segments may be accomplished using current equipment and techniques (e.g., semi trucks, etc.). Thus, new ways, regulations, etc. of transporting wind turbine blades do not have to be developed to accommodate blades of increased length. Furthermore, segmented blades allow maintenance and repairs to be made by replacing damaged blade sections, as opposed to the entire blade. While the segmented nature of the blades provides certain benefits and addresses many issues, the issue around the strength of the connection joint remains a concern for making a segmented approach viable for blades of increasing length. Further aspects of the present invention are directed to providing a connection joint having increased strength and making a segmented blade design viable.

FIG. 3A illustrates a cross section of the blade 20 in accordance with one embodiment of the invention (wherein the webs have been removed for clarity purposes) through the first blade section 22. As illustrated in this figure, the first blade section 22 includes spar caps 50a, 52a associated with an upper shell half that defines the suction side 34 and a lower shell half that defines the pressure side 36 of the blade 20, respectively. Additionally, the blade 20 may include additional support elements adjacent the trailing edge 32 in the form of trailing edge stringers 54a, 56a also associated with the shell halves that define the suction and pressure sides 34a, 36a of the blade 20. FIG. 3B shows a similar cross section through the second blade section 24, which includes spar caps 50b, 52b and trailing edge stringers 54b, 56b associated with the upper and lower shell halves that define the suction and pressure sides of the blade 20. In one embodiment, the spar caps 50, 52 and trailing edge stringers 54, 56 may be incorporated into the blade so as to form part of the outer shell of the blade sections 22, 24. In this regard, the spar caps 50, 52 and the trailing edge stringers 54, 56 may be formed from pre-cured, solid pultrusion strips for reinforcement or strengthening purposes. These pultrusions are often long, flat strips formed of straight carbon filaments embedded in cured resin matrix. Pultrusions may extend along a significant portion of a blade's spanwise extension. In the instant case, the pultrusions may extend for a substantial length of the first and second blade sections 22, 24. The flat pultruded strips are typically laid up in longitudinal stacks during moulding of the blade sections, as discussed below. While the present embodiment illustrates the spar caps and trailing edge stringers being incorporated into the outer shell of the blade sections, the invention is not limited to such an arrangement. For example, it should be recognized that aspects of the invention may be used in alternative embodiments wherein the spar caps and possibly the training edge stringers do not form part of the outer shell of the blade sections, but engage with an inner surface of the outer shell. In such an embodiment, the spar caps may be formed from pultrusions or be formed from fibers and resin materials made through other processes generally known in the art. Thus, the invention is not limited to that shown in FIG. 3.

As illustrated in FIG. 3, a connection joint 60 between the first and second blade sections 22, 24 of the blade 20 at a joint interface 26 includes a plurality of connecting elements 62 integrated into the blade sections 22, 24 at their respective blade interfaces 38, 42. More particularly, the connecting elements 62 may be integrated into the spar caps 50, 52, and preferably also the trailing end stringers 54, 56, at their respective blade interfaces 38, 42. As illustrated in this figure, the connecting elements 62 may be distributed along a width of the spar caps 50, 52 and trailing edge stringers 54, 56 (e.g., in a chordwise direction of the blade) and be substantially embedded within the material that forms spar caps 50, 52 and trailing edge stringers 54, 56. One or more connecting elements 62, for example two connecting elements, may also span a thickness of the spar caps 50, 52 and trailing edge stringers 54, 56 (e.g., in a flapwise direction of the blade) and be substantially embedded in the material that forms these elements. A method for integrating the connecting elements 62 within the material of the spar caps 50, 52 and trailing edge stringers 54, 56 will be described more fully below. The number of connecting elements 62 along the width of the spar caps 50, 52 and trailing edge stringers 54, 56 depends on the size of the blade 20, among potential other factors, but may be anywhere from 20 to 80 connecting elements for blades between 50 m-80 m in length. It should be realized, however, that more or less connecting elements may be used depending on the specific application. As will be explained more fully below, close packing of the connecting elements is allowed without negatively impacting the structural integrity of the connection joint 60. A thickness dimension of the spar caps 50, 52 and/or trailing edge stringers 54, 56 may be gradually tapered down towards the joint between respective blade segments. In this way, respective connecting elements 62 may be overlaid on tapered end portions of a spar cap 50, 52 or trailing edge stringer 54, 56. Still further, a width dimension of the spar caps 50, 52 and/or trailing edge stringers 54, 56 may be gradually tapered outwards towards the joint between respective blade segments. In this way, respective connecting elements 62 may be overlaid on widened end portions of a spar cap 50, 52 or trailing edge stringer 54, 56.

Figure 4:
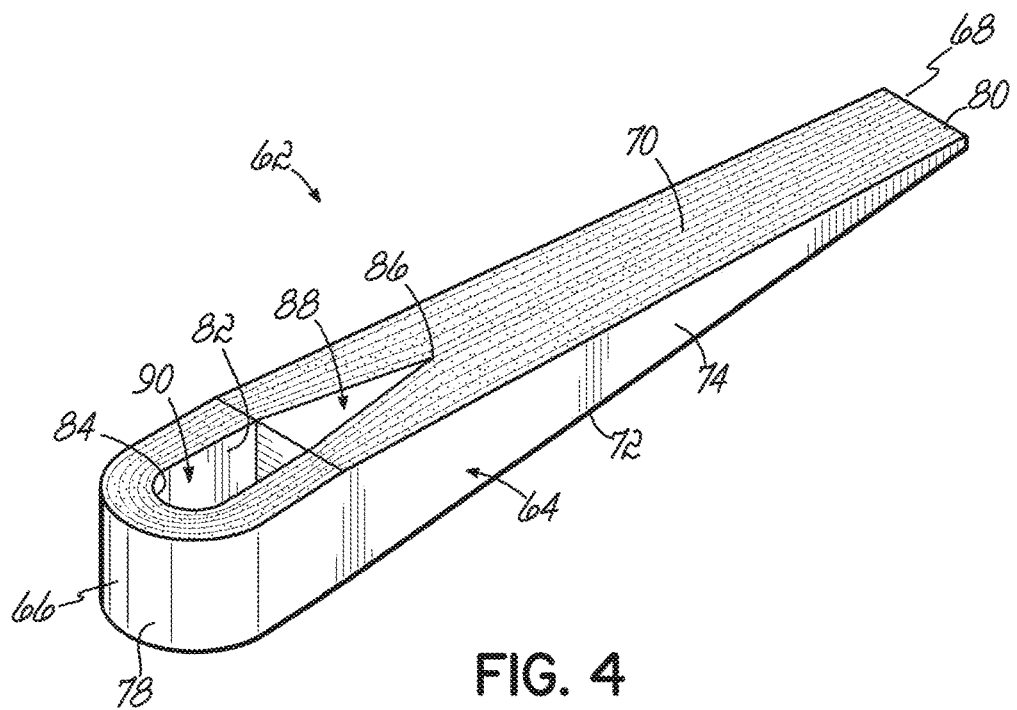
FIG. 4 is a perspective view of a connecting element according to one embodiment of the invention.
Figure 5:
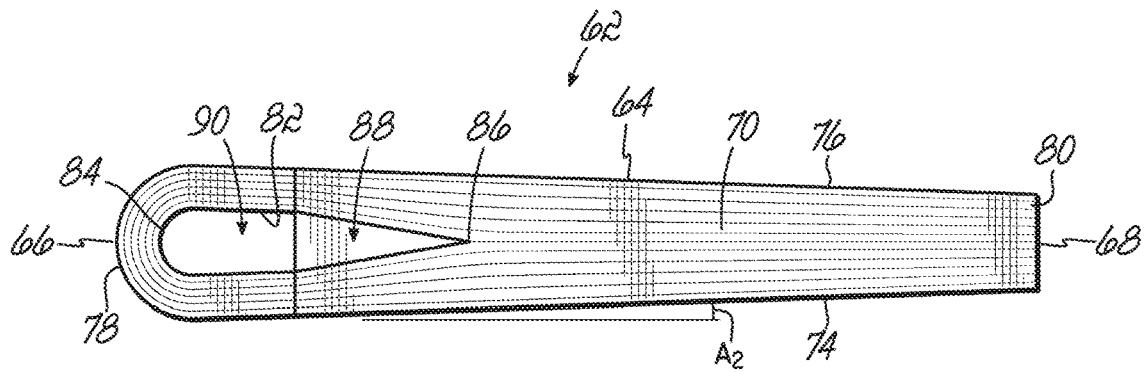
FIG. 5 is top plan view of the connecting element shown in FIG. 4.
Figure 6:
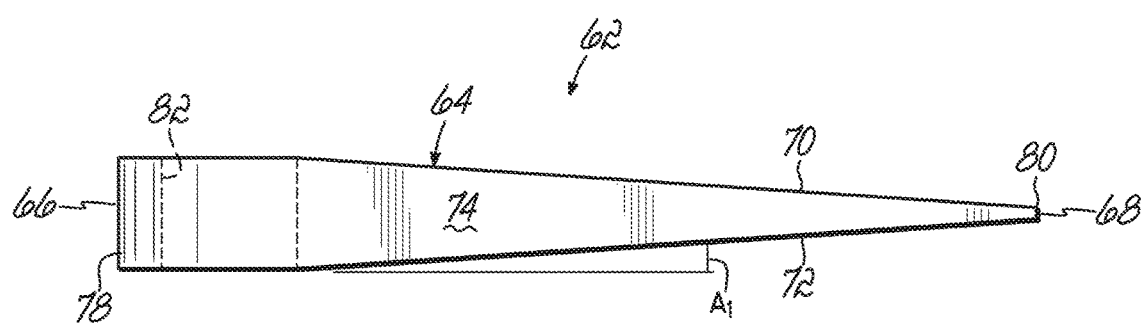
FIG. 6 is a side view of the connecting element shown in FIG. 4.
Figure 7C:
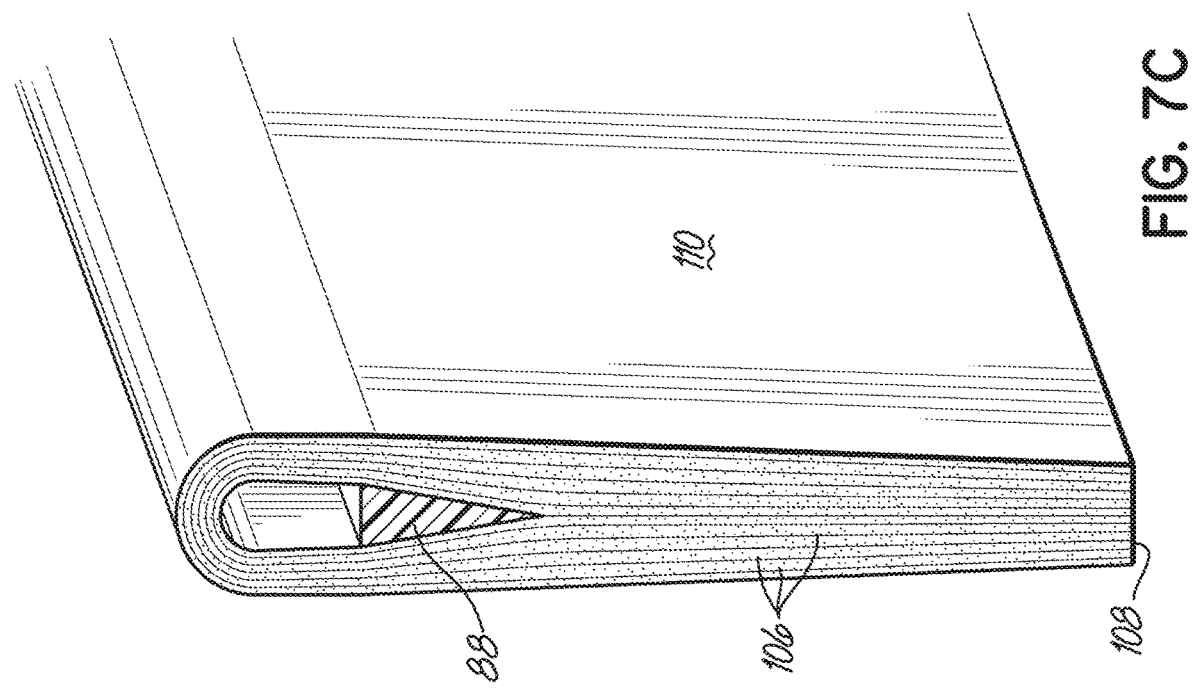
Figure 7B:
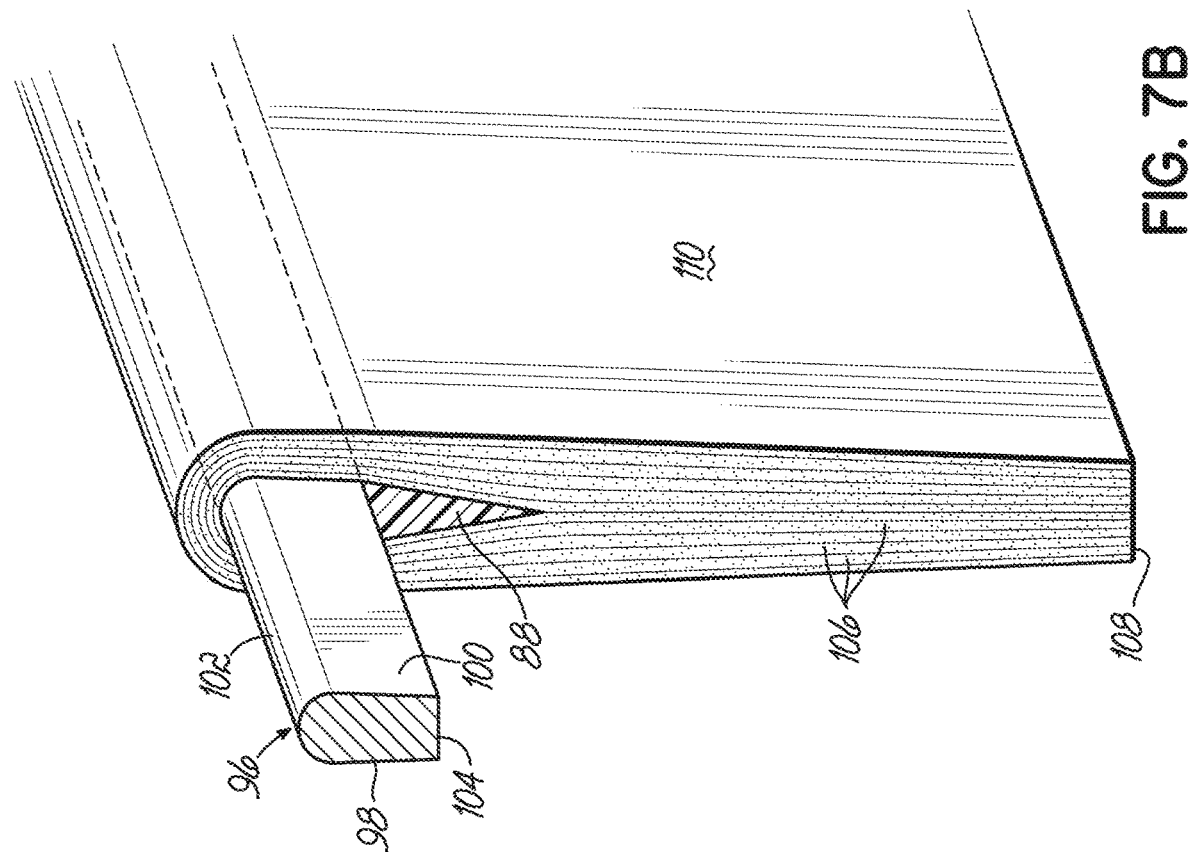
Figure 7D:
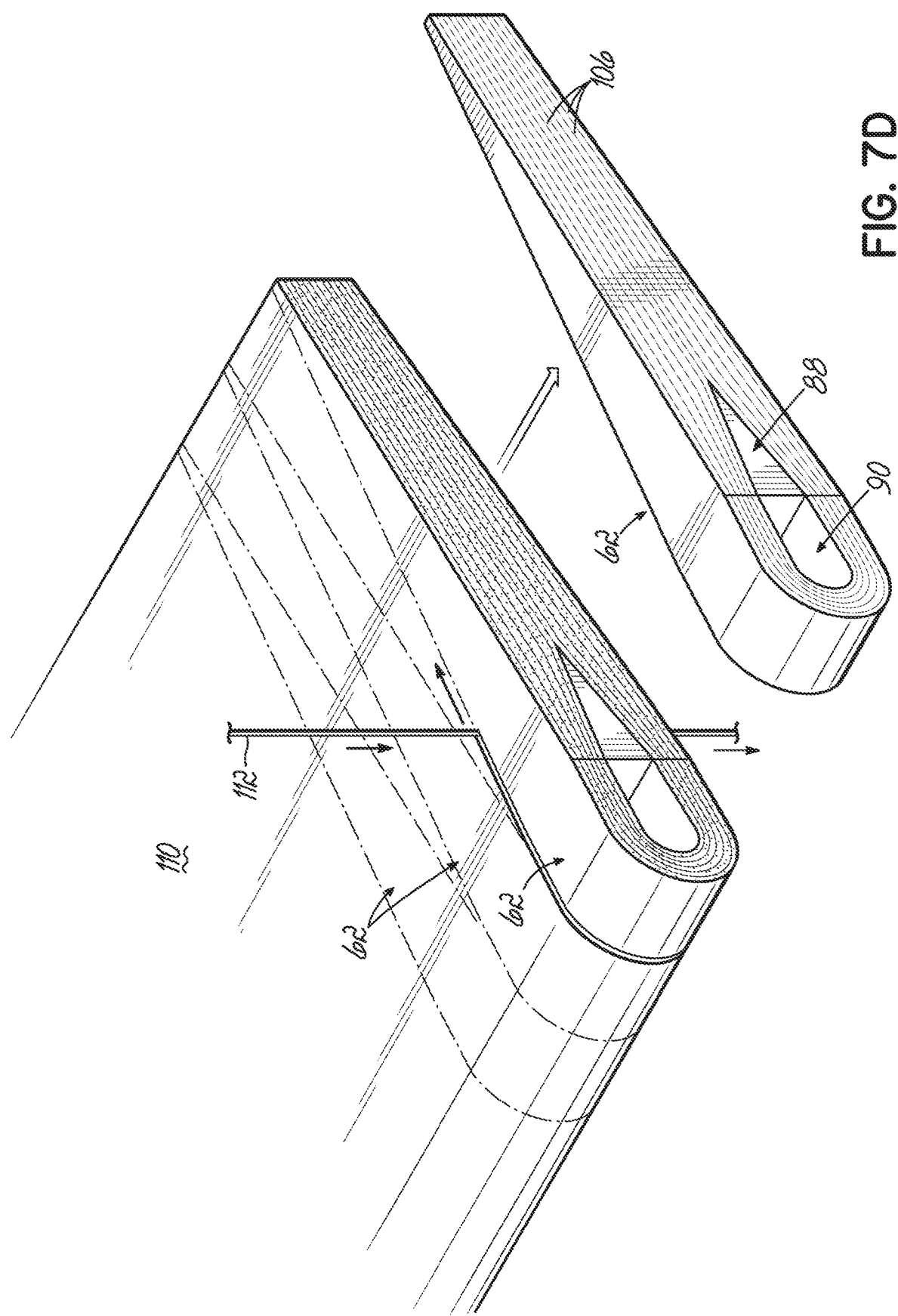

As illustrated in FIGS. 4-6, the connecting elements 62 may be formed from a composite material comprising fibers, such as glass or carbon fibers, and a suitable resin material, such as epoxy. This is in contrast to some conventional connecting elements, which are typically formed from metals, such as steel. In a preferred embodiment, the connecting elements may be mostly formed, if not entirely formed, by non-metallic materials. By way of example, the connecting elements 62 may be entirely formed from a composite material. Alternatively, the majority of the connecting element (e.g., greater than 50%, and preferably greater than 80%) may be formed from a composite material. Forming the connecting elements 62 entirely or mostly from a composite material not only reduces the weight at the joint interface 26 of the blade 20, but also reduces the costs associated with the connecting elements since the composite connecting elements 62 may be formed from relatively cheap materials and in a cost effective manner, as will be explained in more detail below. Furthermore, forming the connecting elements 62 from composite materials may further allow the connecting elements 62 to be integrated into the material of the blade, and in particular the spar caps and trailing edge stringers (which are typically also formed from a composite material) in a manner that provides an increase in the strength of the connection joint 60.

In an exemplary embodiment, a connecting element 62 may be configured as an elongated wedge-shaped member 64 having a head end 66, a tip end 68, a top surface 70, a bottom surface 72, a first side surface 74, a second side surface 76, a head end surface 78 and a tip end surface 80. The top and bottom surfaces 70, 72 may be generally planar or consist of generally planar portions, and converge toward each other in a direction toward the tip end 68 of the connecting element 62 along at least a portion of the length of the connecting element 62. By way of example and without limitation, the top and bottom surfaces 70, 72 may converge toward each other for the entire length of the connecting element 62. Alternatively, the top and bottom surfaces 70, 72 may be generally parallel to each other for a short distance from the head end 66, for example for about 5%-10% of the total length of the connecting element 62, and then converge toward each other along the remaining length of the connecting element 62. In an exemplary embodiment, the taper angle $A_1$ of the top and bottom surfaces 70, 72 may be between about 2 and 30 degrees, preferably between about 4 and 25 degrees, still preferably between about 5 degrees and about 15 degrees. Other valves for the taper angle $A_1$ may also be possible. The wedged configuration of the connecting element 62 facilitates the integration of the connecting element 62 into the material of the spar caps 50, 52 and trailing edge stringers 54, 56 and increases the bond strength between the connecting element and the material in which it is integrated.

In addition to the above, and as illustrated in the figures, the first and second sides 74, 76 of the connecting element 62 may also be tapered in a direction toward the tip end 68 of the connecting element. By way of example and without limitation, the first and second side surfaces 74, 76 may converge toward each other for the entire length of the connecting element 62. Alternatively, the first and second side surfaces 74, 76 may be generally parallel to each other for a short distance from the head end 66, for example for about 5%-10% of the total length of the connecting element 62, and then converge toward each other along the remaining length of the connecting element 62. In an exemplary embodiment, the taper angle $A_2$ of the first and second side surfaces 74, 76 may be between about 2 degrees and about 10 degrees. Other valves for the taper angle $A_2$ may also be possible. The tapering in the sides 74, 76 of the connecting element 62 provides an increased contact area between the connecting elements 62 and the material of the blade in a region between adjacent connecting elements 62. Again, this increases the bond strength between the connecting element and the surrounding material.

As further illustrated in the figures, the head end surface 66 may have a curved or arcuate configuration and smoothly transition to the first and second side surfaces 74, 76. By way of example and without limitation, the head end surface 66 may be generally circular with a radius of curvature $R_1$ between about 1 cm and about 6 cm, preferably between about 1.5 cm and 4 cm. Furthermore, the connecting element 62 includes a through hole 82 adjacent the head end 66 of the connecting element 62 which extends from the top surface 70 to the bottom surface 72. For reasons that are more fully described below, the through hole 82 has an arcuate (e.g., semicircular) first end 84 and a generally v-shaped second end 86. An insert 88 may be positioned in the through hole 82 so as to substantially fill a portion of the through hole 82 adjacent the v-shaped second end 86. The insert 88 is configured to only fill a portion of the through hole 82, and thereby define a passage or eye 90 adjacent the first end 84 of the through hole 82 which extends from the top surface 70 to the bottom surface 72. In one embodiment, the insert 88 may be generally triangularly shaped and be formed from a composite material. The composite material of the insert 88 may be the same or different than the composite material of the remaining portions of the connecting element 62. By way of example, the insert 88 may be formed from a glass or carbon fiber and a resin material, such as a suitable epoxy resin. However, other materials may also be used to form the insert 88. In embodiments, the insert may be formed from wood such as balsa wood or balsa wood impregnated for additional stiffness. In still further aspects, the insert 88 may be made from a resin material or other plastics material. Preferably, the material of the insert 88 may have a thermal expansion coefficient similar to the thermal expansion coefficient of the composite material of the connecting element 62. These materials should be compatible with the composite material of the body 64 so as to provide a strong bond therebetween. A top surface of the insert 88 may be selected such that the eye 90 has a desired shape. For example, the top surface may be flat or may be curved. In general, the bore, or eye 90 may be said to extend through the blade sections 22, 24 in a thickness direction of the blade 20 or blade shell.

In the disclosed embodiment, the eye 90 in the connecting element 62 may be bounded in part by the insert 88 and in part by the member 64 that forms the connecting element 62. In this example, the through hole 82 and the eye 90 through the connecting element 62 is not formed by a drilling or machining operation that tends to cut or otherwise break the fibers of the body 64, thereby creating fiber ends at the boundary of the drilled or machined bores. In contrast to this process, the through holes 82 of the connecting elements 62 may be formed without a post drilling or milling operation, and without cutting or breaking the fibers that form the connecting elements 62. It is believed that providing a through hole 82 and an eye 90 that is not the result of a drilling or milling process, such that the boundary of the through hole 82 or eye 90 is not formed by cut ends of the fiber material will increase the strength of the connection joint 60 in the area of the eye 90. This is particularly relevant because the forces on the outer blade section are transferred across the joint interface 26 to the inner blade section and ultimately through the root end 28 of the blade and to the hub 18. As explained below, this may be achieved by folding finite length fiber rovings to form the through hole in the connecting element.

FIGS. 7A-7D schematically illustrate an exemplary process for forming the connecting elements 62 having an eye 90 as described above. In this regard, an elongate mandrel 96 may be provided having a U-shaped or D-shaped cross sectional profile. Such a profile provides a pair of opposed, generally planar side surfaces 98, 100 and an arcuate or curved top surface 102. The shape of the top surface 102 may be selected so as to correspond with the shape of the first end 84 of the through hole 82. Thus in one embodiment, the top surface 102 may be semicircular with a radius of curvature between about 0.4 cm and about 2 cm, preferably between about 0.4 cm and about 2 cm; preferably between about 0.5 cm and 1.5 cm. This range should be between 10% and 50% below the radius of curvature of the head end surface 78. A bottom side 104 of the mandrel 96 may be closed off by a surface or be open. The mandrel 96 may be formed of metal or other suitable material known to those of ordinary skill in the art.

The insert 88 that is eventually coupled to the through hole 82 to form the eye 90, which may be provided as an elongate member having the desired cross-sectional configuration (e.g., triangular), may be temporarily secured to the bottom side 104 of the mandrel 96 so as to depend therefrom. At this point, a plurality of finite length fiber rovings may be essentially folded over the top surface 102 of the mandrel 96 such that the fiber rovings drape down from the side surfaces 98, 100 of the mandrel 96. The center region of the fiber rovings are adjacent the top surface 102 of the mandrel 96 and the ends of the fiber rovings are then brought together at a tip end 108. Accordingly, the fiber rovings generally conform to the shape of the top and side surfaces 102, 98, 100 of the mandrel 96 and to the side surfaces of the insert 88 depending from the bottom side 104 of the mandrel 96. Bringing the ends of the fiber rovings together provides a tapering configuration that provides the taper in the first and second side surfaces 74, 76 in the connecting element 62. The fiber rovings may be provided by stacking a plurality of fiber sheets or plies 106. The fiber plies 106 may be dry fiber sheets or resin-impregnated plies sheets (e.g., pre-preg) either uncured, partially cured or combinations thereof. The fiber plies 106 may further be unidirectional fiber plies, biaxial fiber plies, or a combination thereof in a wide range of ordered configurations (e.g., a repeated pattern of three unidirectional plies and one biaxial ply). The number of fiber plies 106 that are stacked onto the mandrel 96 may be selected so as to provide the desired width in the connecting element 62. Additionally, the length of the fiber plies 106 may be selected so as to provide the desired length in the connecting element 62. The width of the fiber plies 106 may be selected so as to fit on the length of the mandrel 96. As explained below, ultimately, the composite article formed from this process will be subject to further processing so as to provide a plurality of connecting elements 62.

Once the layup process of the fiber plies 106 on the mandrel 96 is complete, the article 110 may be fully cured or at least partially cured by a suitable curing process known to those of ordinary skill in the art. Subsequent to the curing process, the article 110 may be removed from the mandrel 96 such that the article 110 includes the fiber plies 106, resin, and the insert 88 formed together. From here, the article 110 may be subject to post processing techniques to form a plurality of connecting elements 62 from the article 110. In this regard, the article 110 may be subject to a cutting operation (e.g., from a wire cutter 112) so as to form discrete connecting elements 62. As can be appreciated, the cutting operation on the article 110 forms the top and bottom surfaces 70, 72 of the connecting element 62. The cutting operation is configured so as to form the tapered configuration in the thickness direction of the connecting elements 62.

The process described above results in each of the connecting elements 62 having the shape and geometry described above. The process is particularly beneficial for producing a through hole in the connecting element without cutting the fibers that form the composite member. In particular, the head end 66 of the connecting elements 62 may be formed by the longitudinal side surfaces of continuous strands of fibers. There are essentially no fiber ends at the boundary of the through hole 82. The connecting element with through hole may be thought of as a folded roving of fibers that through the folding of the fibers creates an eye through the element. For this reason the connecting elements 62 may be referred to as roving eyes. In any event, the arrangement of the fibers in the roving eye which create the through hole as part of the fiber arrangement is believed to significantly increase the strength of the connection joints. The connecting elements 62 may vary in size as required by the application. In an exemplary embodiment, a connecting element may have a length between about 15 cm and about 1.5 m; preferably between about 25 cm and about 1 m; a width (at the head end) between about 20 cm and about 6 cm; and a height (at the head end) between about 4 cm and about 15 cm. These ranges are merely exemplary and the invention is not limited to these values.

Figure 8:
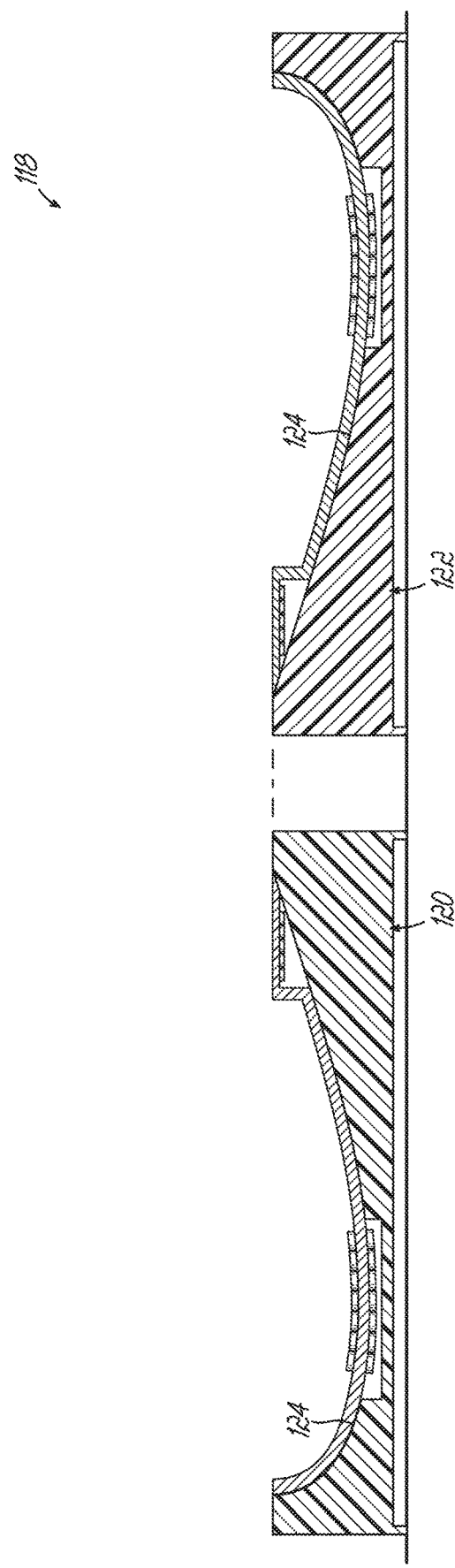
FIG. 8 schematically illustrates a moulding apparatus for making blade segments.
Figure 9A:
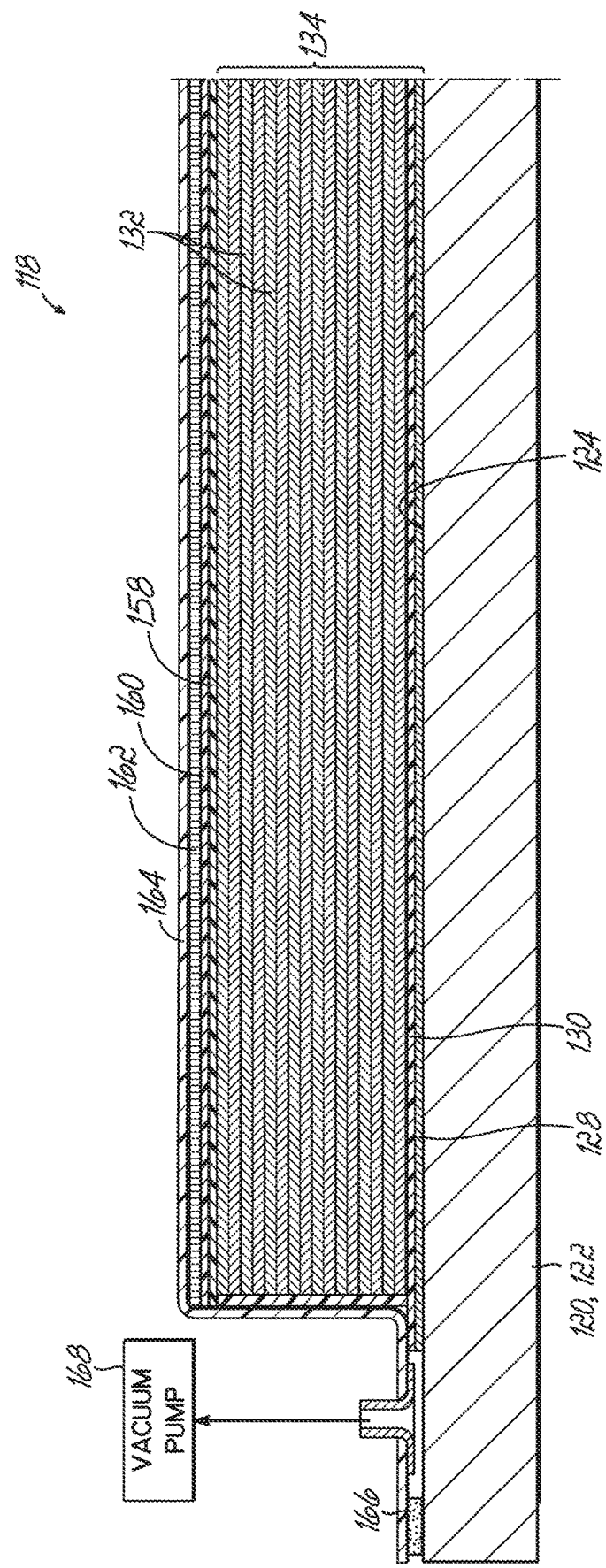
FIGS. 9A-9C schematically illustrate a moulding method for making a blade section.
Figure 9B:
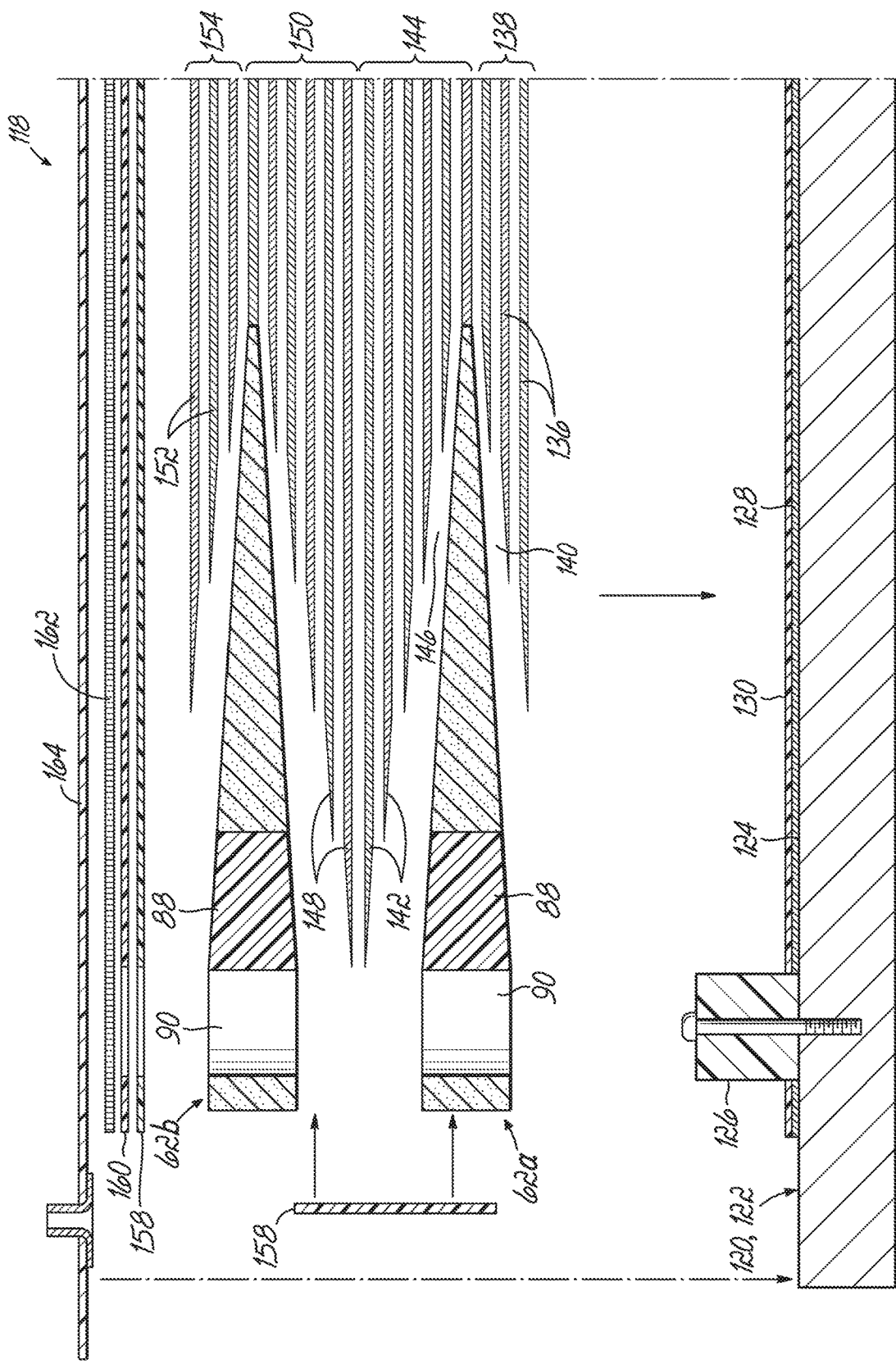
Figure 9C:
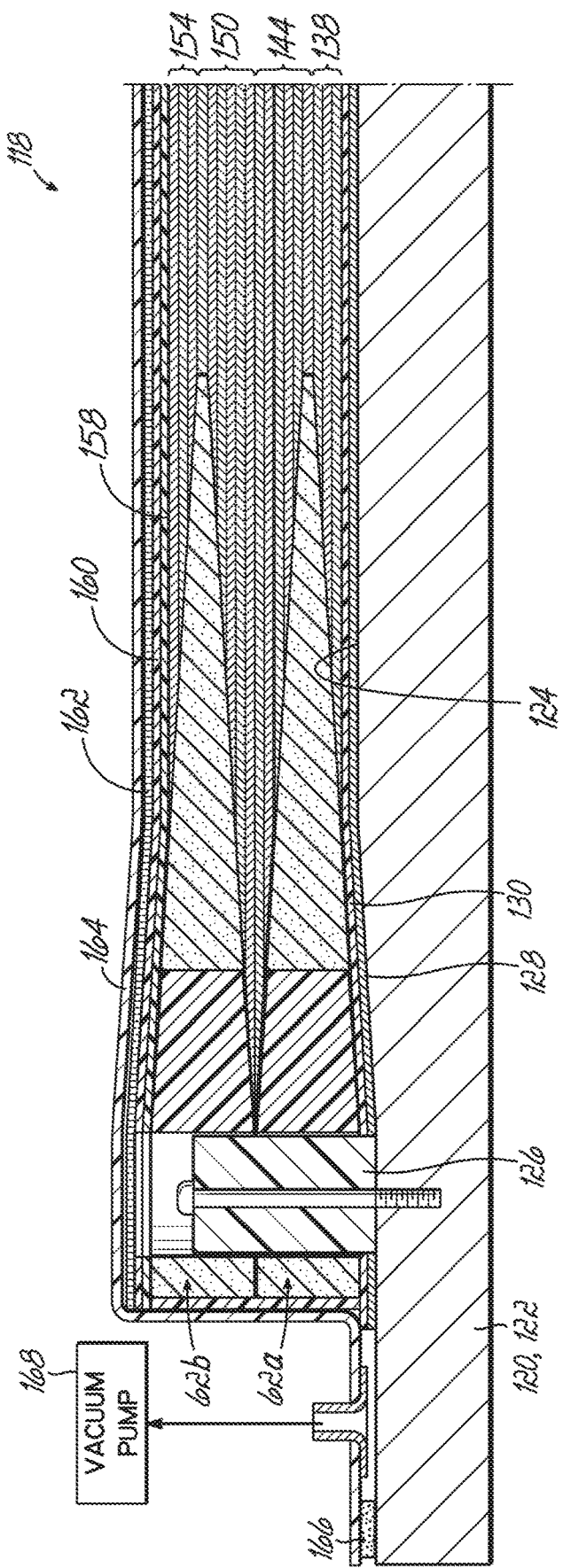

With the individual connecting elements 62 now formed through, for example, the process described above, the integration of the connecting elements 62 into the blade sections 22, 24 that form the rotor blade 20 will now be described in more detail. In this regard, FIGS. 8-9c schematically illustrate an exemplary method of integrating the connecting elements 62 into the blade sections 22, 24. In one embodiment, the blade sections 22, 24 may be formed through a moulding process using a moulding apparatus 118 having a first mould half 120 and a second mould half 122 for forming the upper and lower shell halves that define the suction and pressure sides 34, 36 of the blade 20, respectively. Each mould half 120, 122 includes a contoured inner surface 124 that defines the outer surface of the upper and lower shell halves of the blade sections 22, 24. A plurality of pegs or anchors 126 may be removably secured to the inner surface 124 of each of the mould halves 120, 122 of the moulding apparatus 118 adjacent a first end of the moulds. This first end will correspond to the blade interface 38, 42 of the blade sections 22, 24 since it will include the connecting elements. The number and position of anchors 126 may correspond to the number and position of connecting elements 62 desired in the design of the connection joint 60. The anchors 126 may be formed from a suitable thermoplastic polymer (e.g., having desired thermal expansion properties) that facilitates removal of the blade sections 22, 24 from the moulding apparatus 118 after curing. By way of example and without limitation, the anchors 126 may be formed from polytetrafluoroethylene (PTFE). Other materials, however, may also be acceptable.

The moulding method may include placing a release agent 128 such as a liquid release coating, a wax, or a solid barrier (e.g., Teflon® tape) over the inner surface 124 of the mould halves 120, 122. An optional layer (not shown) of release material (e.g., film) may then be applied over the release agent 128. In addition, a first optional layer of peel ply 130 may be applied over the release material layer, if present, or directly over the release agent 128. Next, several layers 132 of fiber fabric may be placed over one another (e.g., stacked) to define an assembly of layers 134, until a desired, predetermined thickness is reached in accordance with the design. The fiber fabric may include glass fiber, carbon fiber or other material or combination of materials known to those of ordinary skill in the art. The fiber fabric may be resin-impregnated (e.g., a pre-preg) or be dry. The layers 132 of the first assembly 134 may be laid up in the portions of the first and second moulds 120, 122 which do not correspond to the spar caps 50, 52 and trailing edge stringers 54, 56.

In the portions of the first and second moulds 120, 122 which correspond to the spar caps 50, 52 and trailing edge stringers 54, 56, several layers of pultruded carbon fiber strips 136 may be placed over one another (e.g., stacked) to define a first assembly 138 of pultruded strips having a desired, predetermined thickness in accordance with the design. The layers 136 may be laid up in the mould halves 120, 122 so as to define a taper 140 in the pultruded material of the first assembly 138 of strips.

After the first assembly 138 of pultrusions has been laid in the mould halves 120, 122, a first connecting element 62a may be located in the mould halves. In this regard, the anchors 126 may have a shape that corresponds to the shape of the eye 90 in the connecting elements 62 such that the connecting elements 62a may be hung or supported from the anchors 126. The taper of the bottom surface 72 of the connecting elements 62a generally correspond to the taper 140 of the first assembly 138 of pultruded strips. After locating the connecting elements 62a in the moulding halves 120, 122, additional layers 142 of the pultruded strips may be placed over one another to define a second assembly 144 of pultruded strips, until a desired, predetermined thickness is reached in accordance with the design. The layers 142 of the second assembly 144 may be laid up in the mould halves 120, 122 so as to define a taper 146 in the material. The taper 146 in the material may generally correspond to the taper in the top surface 70 of the connecting element 62a.

Subsequently, pultruded strips 148 may be laid up in the mould halves 120, 122 to define a third assembly 150 of pultruded strips. A second connecting element 62b may be inserted into the mould halves 120, 122 and supported by the anchors 126 such that the bottom surface 72 of the connecting elements 62b engage the third assembly 150 of pultruded strips. Lastly, pultruded strips 152 are laid on the top surface 70 of the connecting elements 62b to define a fourth assembly 154 of pultruded strips. The third and fourth assemblies 150, 154 may also include suitable tapers corresponding to the taper in the connecting element 62b. Moreover, along the portions of the mould halves 120, 122 corresponding to the spar caps 50, 52 and trailing edge stringers 54, 56, the blade interfaces 38, 42 may include a composite edge support 158 above the head ends 66 of the connecting elements 62. In this regard, the space between the head ends 66 of adjacent connecting elements 62 (in a chord direction of the mould surface and resulting from the arcuate shape of the head ends) may be filled with a dry or resin-impregnated fiber material. By way of example, if the connecting elements 62 are next to each other, a wedge-shaped fiber insert (not shown) may be positioned in the space such that there are essentially no gaps in fibrous material in the region of the head ends 66 of the connecting elements 62. Additional fiber layers may be added above the head ends 66, such as that provided by a fiber tape or bandage. It is the outermost layer of the fiber tape that will result in an end face of the blade sections 22, 24 at their respective blade interfaces 38, 42. Thus, between the first, second, third and fourth pultruded assemblies 138, 144, 150, 154, the fiber inserts and the layers of fiber tape, the connecting elements 62 are essentially embedded and integrated within the composite material of the blade sections 22, 24 at their respective blade interfaces 38, 42. As noted above, while two connecting elements 62a, 62b span the thickness of the spar caps 50, 52 and trailing edge stringers 54, 56 in a flapwise direction, more or less connection elements may be used in alternative embodiments.

Once this assembly is reached, a second optional peel ply 158 made, for example, of nylon or some other tightly woven fabric impregnated with a release agent, may be applied over the formed assembly. Once the second optional peel ply 158 is in place, a layer 160 of release film may be applied thereover. In this embodiment, a breather or bleeder material layer 162 may then be applied over the second optional peel ply 158, which is configured to absorb excess resin and let gases escape during formation of the composite laminate. With continued reference to FIGS. 9A and 9B, a vacuum bag 164 may be placed over the above-mentioned layers and secured in place against the mould halves 120, 122 via a securing element 166, such as a bag sealant tape, and a vacuum source 168 actuated. Actuation of the vacuum source 168 is effective to pull the bag 164 toward the inner surface 124 of the mould halves 120, 122 so as to give shape to the suction and pressure sides 34, 36 of the blade sections 22, 24. The vacuum source 168 is also effective to remove air as well as excess resin from the assembly of fiber layers and resin. When the fiber layers are not pre-impregnated with resin, but are instead dry layers of fiber, a resin distribution system (not shown) may be placed in communication with the layers under the vacuum bag 164 and used to distribute resin to the fiber layers. These steps are generally known in the art and will not be described in further detail.

In a subsequent step, the resulting assembly is allowed to cure or at least partially cure within the mould halves 120, 122, such as through a heating process. Once cured or at least partially cured, the mould halves 120, 122 may be positioned relative to each other, such as placing one mould half on top of the other mould half, to configure the blade sections 22, 24 with an airfoil profile. In this regard, the upper and lower shells that define the suction and pressure sides 34, 36 may be positioned so as to meet along respective edges, which form the leading and trailing edges 30, 32 of the blade sections 22, 24, and bonded together to form the blade sections 22, 24. The anchors 126 may be removed from moulding apparatus 118 such that the blade sections 22, 24 may be removed from the moulding apparatus 118. As noted above, the blade sections 22, 24 now include openings or bores through the outer surface of the upper and center shells as provided by the eyes 90 of the connecting elements 62 at their respective blade interfaces 38, 42. These bores were not formed from a drilling or machining process, but in the formation of the blade sections themselves, and more particularly in the formation of the connecting elements 62 which are integrated into blade sections 22, 24 adjacent their respective blade interfaces 38, 42.

Figure 10:
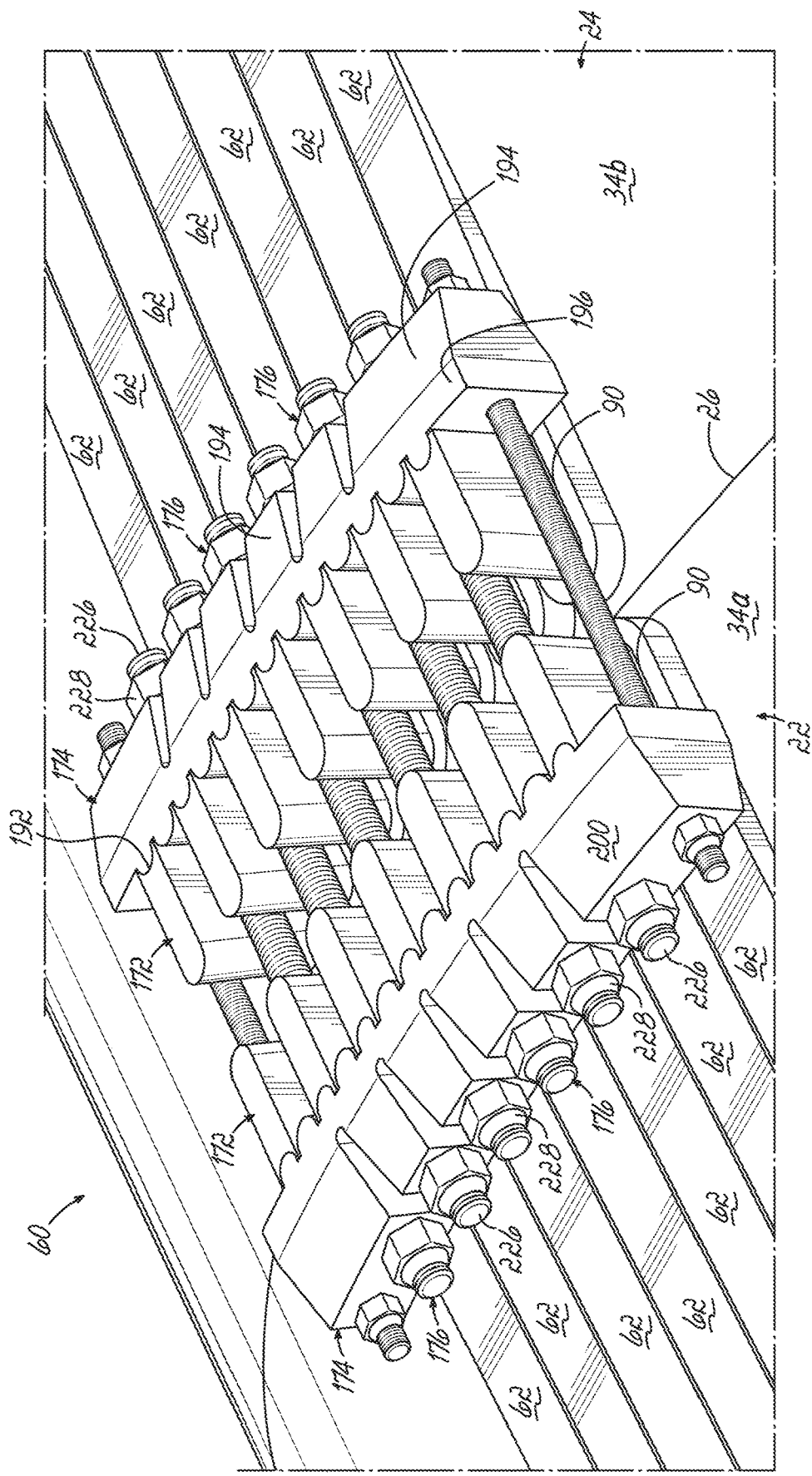
FIG. 10 is an exterior view of a connection joint in accordance with one embodiment of the invention.
Figure 10A:
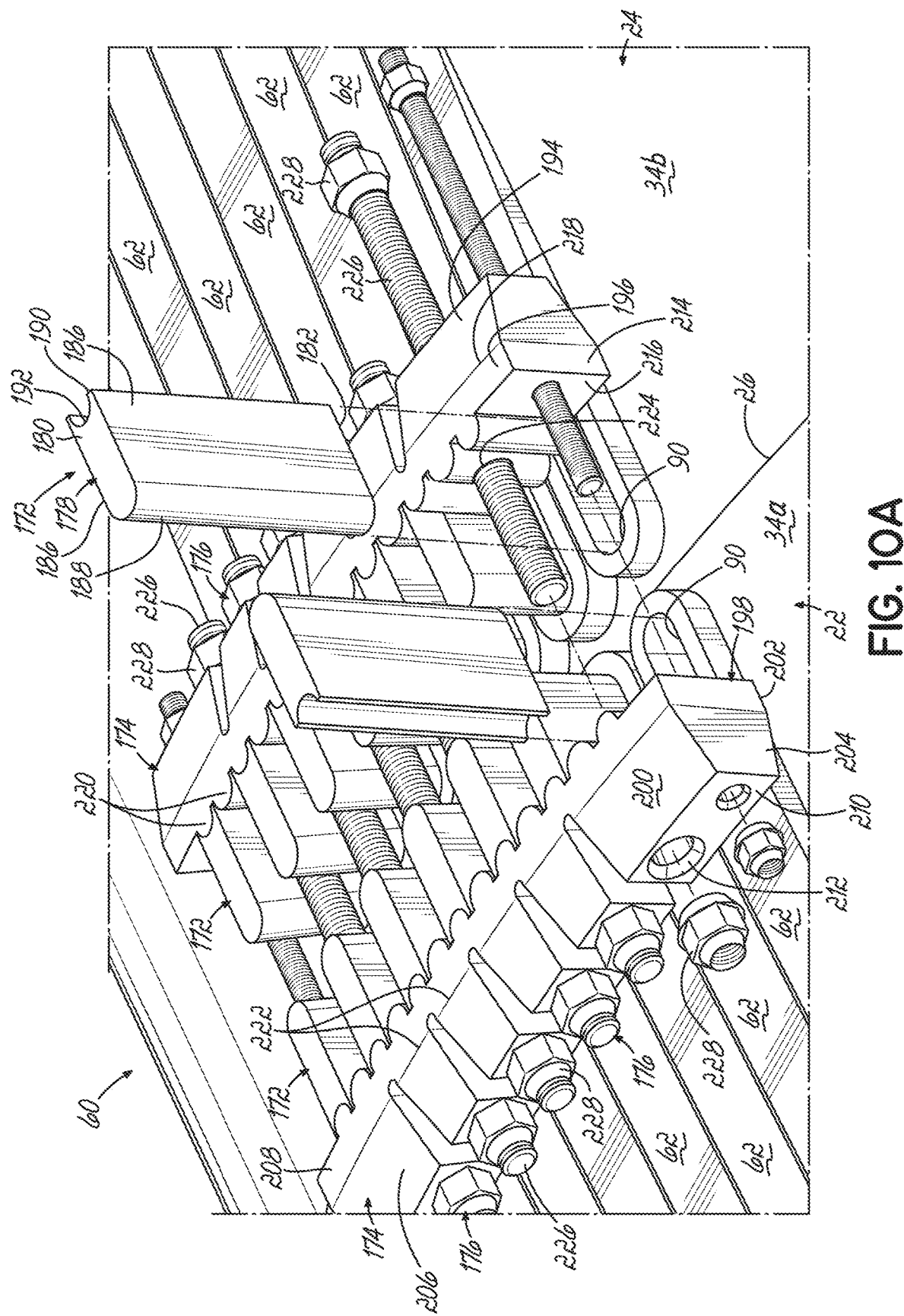
FIG. 10A is a partial disassembled connection joint shown in FIG. 10.
Figure 11:
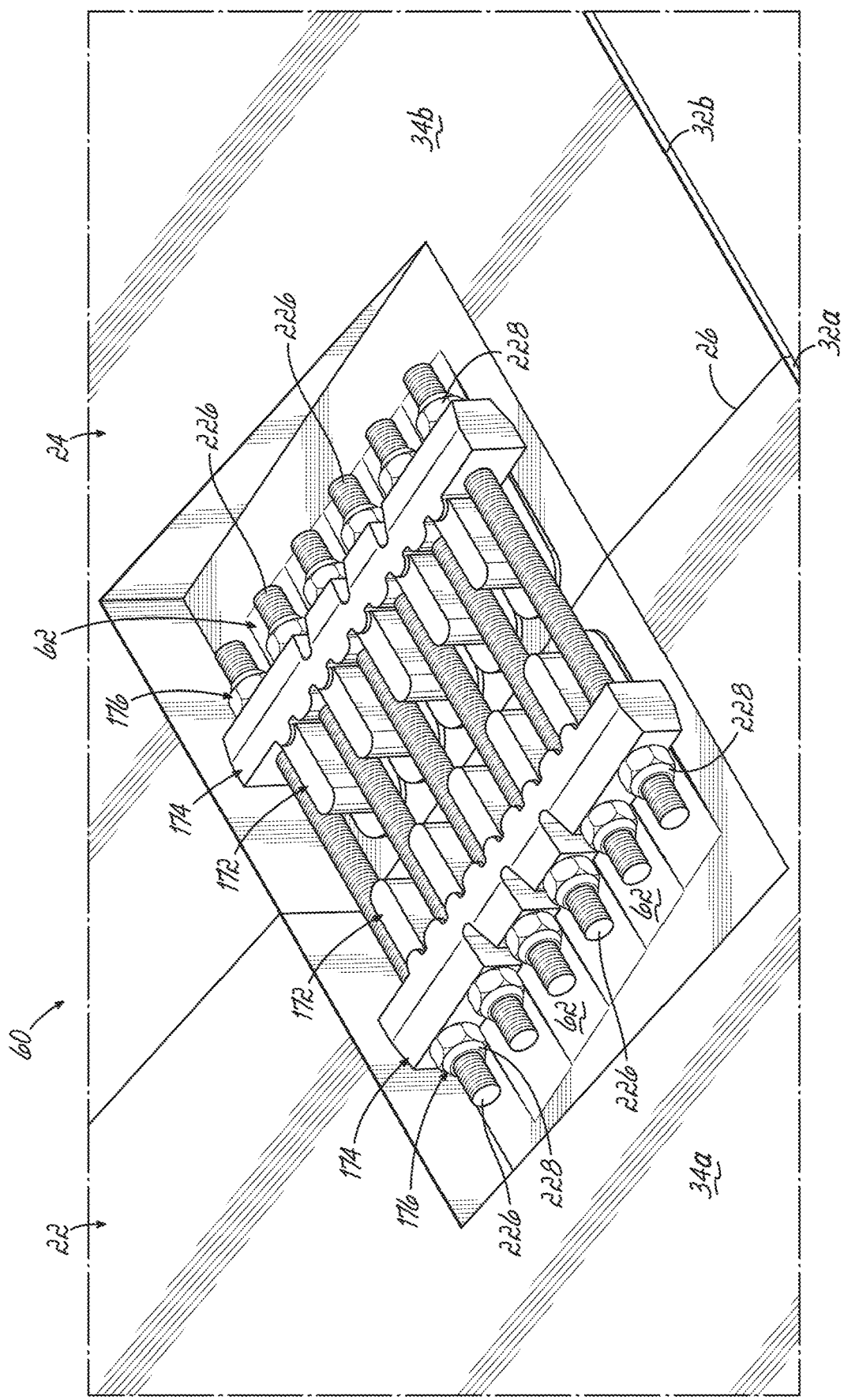
FIG. 11 is an exterior view of a connection joint in accordance with one embodiment of the invention.
Figure 12:
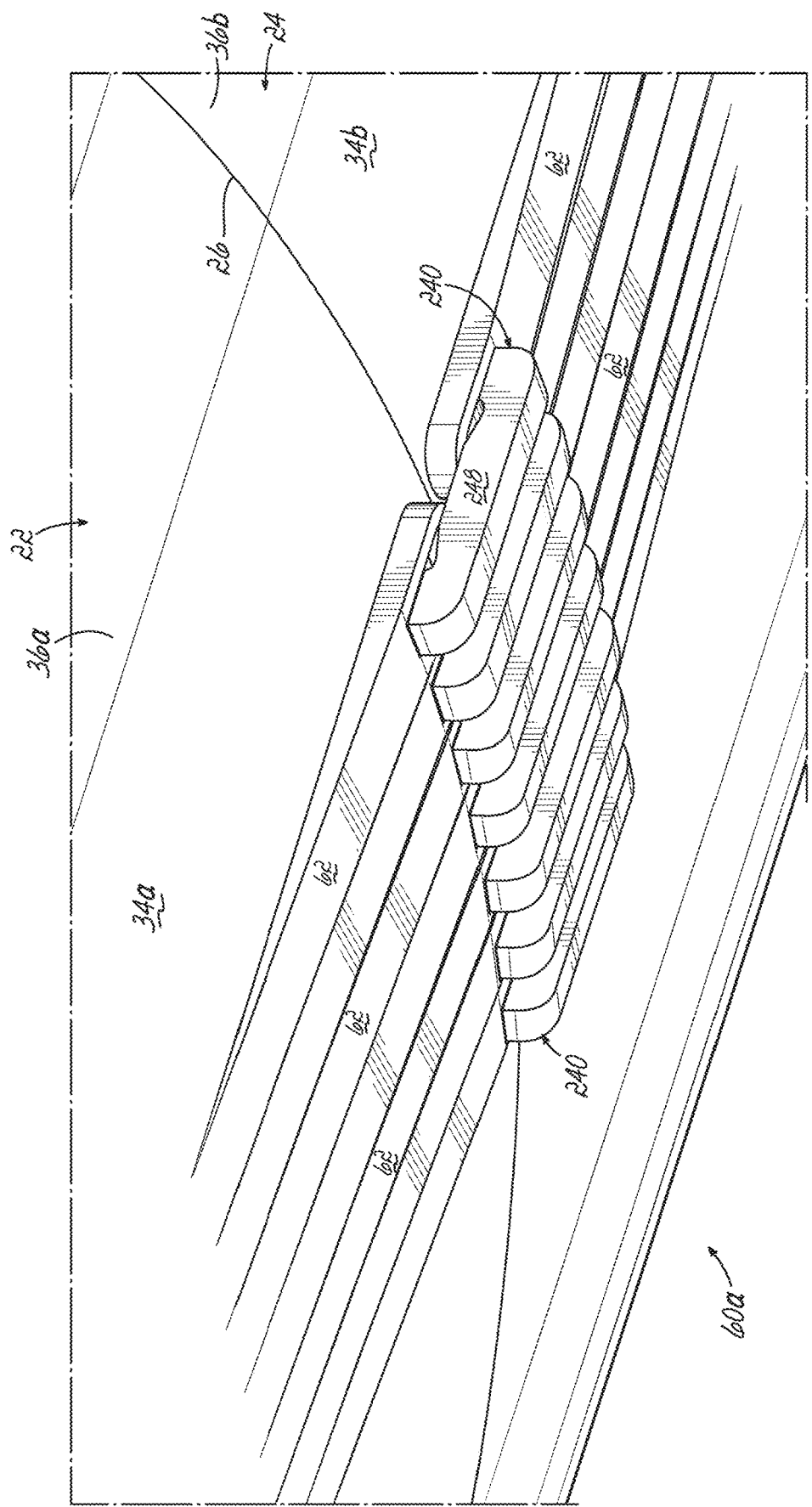
FIG. 12 is an exterior view of a connection joint in accordance with one embodiment of the invention.
Figure 13:
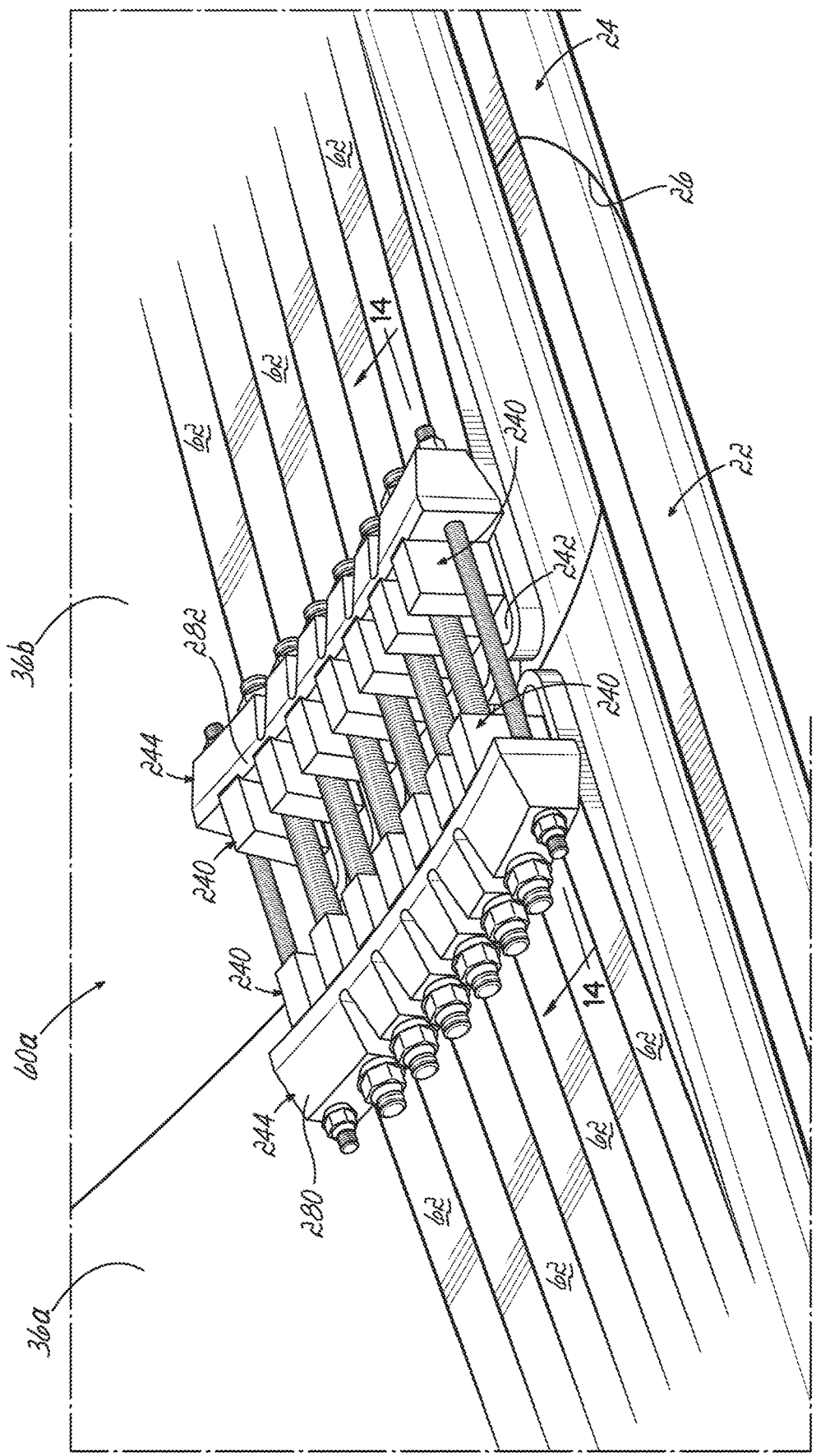
FIG. 13 is an interior view of a connection joint in accordance with one embodiment of the invention.
Figure 16:
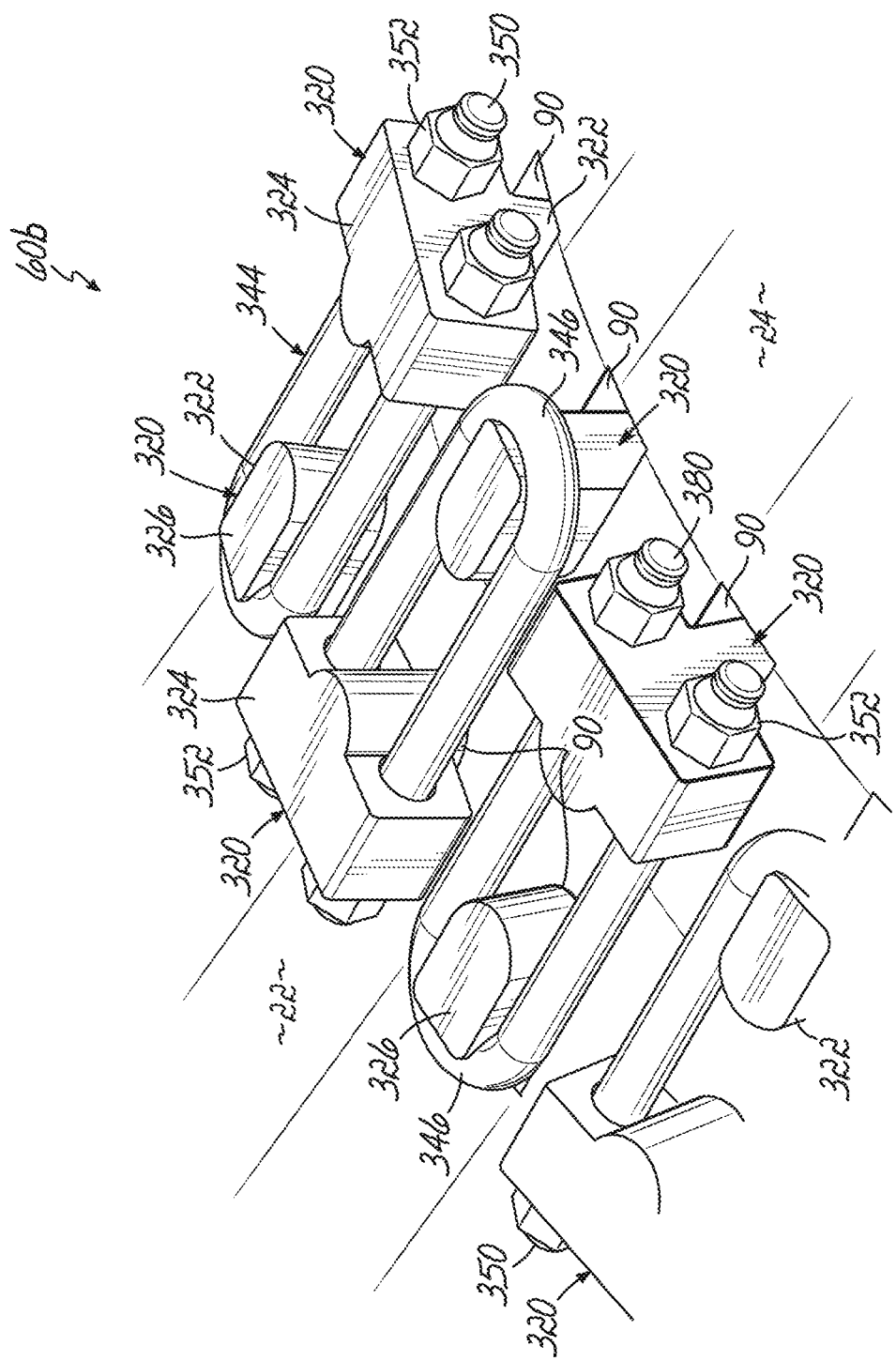
FIG. 16 is an exterior view of a connection joint in accordance with another embodiment of the invention.

With an improved design of the blade interfaces 38, 42 of the blade sections 22, 24 as described above, various embodiments will now be described directed to the coupling of the blade sections 22, 24 to form an assembled blade 20 using the connecting elements 62. In this regard and in further reference to the FIGS. 10-11, in addition to the connecting elements 62 the connection joint 60 further includes a plurality of slide members or cross pins 172 configured to be engaged with respective eyes 90 of the connecting elements 62, a plurality of retention blocks or heads 174, and a plurality of fasteners 176 for coupling the cross pins 172 associated with the first blade section 22 to the cross pins 172 associated with the second blade segment 24 and across the joint interface 26. The cross pins 172 have a cross-sectional shape that generally matches the shape of the eyes 90 that extend through the connecting elements 62. In this embodiment, the cross pins 172 include an elongate body 178 having generally planar top and bottom surfaces 180, 182, first and second generally planar side surfaces 186, a generally arcuate first end surface 188, and a second end surface 190. The size of the cross pins 172 is such as to fit within the eyes 90 of the connection elements 62. The first end surface 188 may be curved to generally correspond to the curvature of the first end 84 of the eyes 90, and thereby distribute forces in an efficient manner. The second end surface 190 may include a groove 192 along the end surface 190 and being generally arcuate in cross section. In an exemplary embodiment, the cross pins 172 may be formed from metal, such as steel. However, other suitable materials may also be possible and within the scope of the invention.

The retention heads 174 include a plurality of block segments 194 and a distribution plate 196 coupled to the block segments 194. The block segments include a body 198 having generally planar top and bottom surfaces 200, 202, first and second generally planar side surfaces 204, 206, a generally planar first and second end surfaces 208, 210. Each of the block segments 194 includes a through hole 212 extending between the first and second end surfaces 208, 210. The distribution plate 196 includes a generally rectangular body 214 having a first end surface 216 and a second end surface 218. The first end surface 216 includes a plurality of arcuately shaped ridges 220 and the second end surface 218 includes a plurality of generally planar lands 222 configured to couple to the first end surface 208 of the block segments 194. The distribution plate 196 includes through holes 224 configured to register with the through holes 212 in the block segments 194. The distribution plate 196 and the block segments 194 may be formed as a unitary piece. Alternatively, these may be formed separately and subsequently coupled together. The retention heads 174 may have a width (e.g., in a chordwise direction) generally corresponding to the width of the spar caps 50, 52 and trailing edge stringers 54, 56. For example, the retention heads 174 may have a width configured to accommodate anywhere between 2-12 block segments. Other values, however, are also possible. In an exemplary embodiment, the retention heads 174 may be formed from metal, such as steel. However, other suitable materials may also be possible.

In an exemplary embodiment, the width of the spar caps 50, 52, and possibly also the width of the trailing edge stringers 54, 56 may vary as the blade interfaces 38, 42 of the blade sections 22, 24 are approached (FIG. 3). In this regard, the width of the spar caps 50, 52 (and perhaps the trailing edge stringers 54, 56) may increase in a direction toward the blade interfaces 38, 42. The additional width provides space to provide an increased number of connecting elements 62 for forming the connection joint 60. Furthermore, as explained above, a thickness of the spar caps 50, 52 and trailing edge stringers 54, 56 decreases in a direction toward the blade interfaces 38, 42 to accommodate the wedged connecting elements 62.

To facilitate a coupling between the first and second blade segments, the cross pins 172 may be inserted through respective eyes 90 of the connecting elements 62 at the spar caps 50, 52 and the trailing edge stringers 54, 56. The cross pins 172 may extend beyond the thickness or height of the eyes 90 so that a portion of the cross pin 172 extends above, below, or both above and below the material that forms the spar caps 50, 52 and the trailing edge stringers 54, 56. This corresponds, for example, to the cross pins 172 extending beyond the exterior and interior surfaces of the blade sections 22, 24. With the cross pins 172 so positioned relative to the eyes 90 of the connecting elements 62, retention heads 174 may be positioned on a blade section so that the first end surface 216 of the distribution plate 196 abuts the second end surface 190 of a plurality of cross pins 172. Thus, the retention heads 174 are supported by a plurality of cross pins 172. More particularly, a ridge 220 in the first end surface 216 of the distribution plate 196 is configured to be received in the groove 192 in the second end surface 190 of the cross pins 172, and the through holes 212, 224 in the retention heads 174 are centrally located between two adjacent cross pins 172. Fasteners, such as stud bolts 226 having threaded ends may be inserted through the through holes 212, 224 so as to extend across the joint interface 26 and engage a through hole 212, 224 in a retention head 174 on the other blade section. The retention heads may be clamped together via nuts 228 to thereby couple the two blade sections 22, 24 together.

In an exemplary embodiment, retention heads 174, stud bolts 226 and nuts 228 may be used on the external side of the blade sections 22, 24 and on both sides of the joint interface 26, and on the internal side of the blade sections 22, 24 and on both sides of the joint interface 26 for both the spar caps 50, 52 and the trailing edge stringers 54, 56. In an alternative embodiment, the region of the trailing edge stringers 54, 56 in the interior side of the blade sections 22, 24 may not permit enough space for a worker to secure the nuts 228 to the stud bolts 226. In this situation, the connection joint 60 may only include retention heads 174, stud bolts 226 and nuts 228 on the external side of the blade sections 22, 24. Thus, the blade sections 22, 24 may be coupled only from the external side at the trailing edge stringers 50, 52. Other arrangements of external and/or internal couplings may be possible and within the scope of the present invention. Once the blade sections 22, 24 are joined together in the manner described above, a fairing 230 (see FIG. 2) may be applied to the exterior side of the connection joint 60 in order to minimize the aerodynamic disruptions due to the presence of the connection joint 60. In this regard, the fairing 230 may include selectively movable and lockable closures 232 for gaining access to the spars and trailing edge stringers at the connection joint 60.

One aspect of the arrangement described above is that the structural elements through which forces are transferred between the blade sections 22, 24 and which extend across the joint interface 26 (e.g., the stud bolts in the embodiment described above) do not extend through or into the material that forms spar caps 50, 52 and the trailing edge stringers 54, 56. In the arrangement above, those structural elements are both above and/or below (e.g., exterior and/or interior to) the material that forms the spar caps 50, 52 and the trailing edge stringers 54, 56. No axial holes have to be drilled or otherwise formed in the material that makes up spar caps 50, 52 and the trailing edge stringers 54, 56 at the blade interfaces 38, 42. This results in less material being removed from the blade interfaces 38, 42 thereby providing a stronger connection joint 60. Furthermore, the forces that are transferred between the blade sections 22, 24 occur through the contact area between the cross pins 172 and the eyes 90 of the connecting elements 62. As noted above, the fibers that form the head end 66 of the connecting elements 62 are not cut or otherwise broken in this region and thus this design constitutes an extremely strong connection interface. Accordingly, it is believed that the connection joint 60 as described above provides a stronger joint for a fixed size of blade interfaces 38, 42, and thus is capable of accommodating increased loading on the blades 20 across the connection joint 60.

In another exemplary embodiment shown in FIGS. 12-15, the connection joint 60a further includes a plurality of U-shaped brackets 240, a pair of shoes 242, a retention head 244, and a plurality of fasteners 310. The U-shaped brackets 240 include a base 248 configured to extend across the joint interface 26 and a pair of legs 250 extending from the base 248 at ends thereof and configured to extend through the eyes 90 of aligned connecting elements 62 on each of the first and second blade sections 22, 24. Each of the legs 250 include an elongate body 252 having first and second generally planar side surfaces 254, 256, and generally planar first and second end surfaces 258, 260 The size of the legs 250 is such as to fit within the eyes 90 of the connecting elements 62. For purposes explained below, the second end surfaces 260 of the legs 250 include a raised knuckle 262 adjacent the base of the bracket 240. In an exemplary embodiment, the U-shaped brackets 240 may be formed from metal, such as steel. However, other suitable materials may also be possible and within the scope of the invention.

Each of the shoes 242 includes a body 264 having generally planar top and bottom surfaces 266, 268, first and second generally planar side surfaces 270, 272, a generally arcuate first end surface 274, and a second end surface 276. The size of the shoes 242 may be such as to also fit within the eyes 90 of the connection elements 62, such that the combination of the shoes 242 and the legs 250 of the brackets 240 occupy the eyes 90 of the connecting elements 62. The first end surface 274 may be curved to generally correspond to the curvature of the first arcuate end 84 of the eyes 90, and thereby distribute forces in an efficient manner. The second end surface 272 may be generally planar and configured to engage planar portions of the first end surface of the legs 250. Moreover, the second end surfaces 272 include a recess 278 configured to receive the raised knuckle 262 in the first end surfaces of the legs 250. In an exemplary embodiment, the shoes 242 may be formed from metal, such as steel. However, other suitable materials may also be possible and within the scope of the invention.

The retention heads 244 may be similar to those described above and include a plurality of block segments 280 and a distribution plate 282 coupled to the block segments 280. The block segments 280 include a body having generally planar top and bottom surfaces, first and second generally planar side surfaces, a generally planar first and second end surfaces. Each of the block segments 280 includes a through hole extending between the first and second end surfaces. The distribution plate 282 includes a generally rectangular body having a generally planar first end surface and a second end surface. The second end surface includes a plurality of generally planar lands configured to couple to the first end surface of the block segments 280. The distribution plate 282 includes through holes configured to register with the through holes in the block segments 280. The retention heads 244 may have a width configured to accommodate anywhere between 2-12 block segments. Other values, however, are also possible. In an exemplary embodiment, the retention heads 244 may be formed from metal, such as steel. However, other suitable materials may also be possible.

To facilitate a coupling between the first and second blade segments, the shoes 242 may be positioned on the U-shaped brackets 240 such that the raised knuckles 262 are received in the recesses 278 of the shoes 242. Accordingly, the shoes 242 may be capable of pivotal movements that accommodate slight misalignments yet still provide a good distribution of forces during use. In any event, that assembly may then be inserted into the aligned eyes 90 of the connecting elements 62 at the spar caps 50, 52 and the trailing edge stringers 54, 56 and across joint interface 26 until the base 248 of the bracket 240 engages a surface (e.g., preferably an exterior surface) of the blade sections 22, 24. The shoes 242 have a length so as to essentially fit within the height of the stacked connecting elements 62 at the blade interfaces 38, 42. In this way, the shoes 242 do not extend beyond the eyes 90 of the stacked connecting elements 62 (e.g., substantially no exposed portions). In contrast, the legs 250 have a length so that an exposed portion of the legs 250 extends beyond a surface (e.g., preferably an interior surface) of the blade sections 22, 24. With the brackets 240 and shoes 242 so positioned relative to the eyes 90 of the connecting elements 62, retention heads 244 may be positioned so that the first end surface of the distribution plate 282 abuts the second end surface 296 of a plurality of legs 250 of the brackets 240. Thus, the retention heads 244 are supported by a plurality of brackets 240 and the through holes in the retention heads 244 are centrally located between the legs 250 of adjacent brackets 240. Fasteners, such as stud bolts 310 having threaded ends 312 may be inserted through the through holes so as to extend across the joint interface 26 and engage a through hole in a retention head 244 on the other blade section. The retention heads may be clamped together via nuts 314 to thereby couple the two blade sections 22, 24 together.

In an exemplary embodiment, the base of the U-shaped brackets 240 may be on the external side of the blade sections 22, 24 while retention heads 244, stud bolts 310 and nuts 314 may be used on the internal side of the blade sections 22, 24. It may also be possible, however, to have the base of the U-shaped brackets 240 on the internal side of the blade sections 22, 24 while retention heads 244, stud bolts 310 and nuts 314 are on the external side of the blade sections 22, 24. Additionally, in one embodiment, the configuration shown above may be used only on the spar caps 50, 52 at the joint interface 26, while another arrangement is used for the trailing edge stringers 54, 56. This may be due, for example, to a lack of sufficient space in the region of the trailing edge stringers 54, 56. Once the blade sections 22, 24 are joined together in the manner described above, a fairing 230 may be applied to the exterior side of the connection joint 60a in order to minimize the aerodynamic disruptions due to the presence of the connection joint 60a. In this regard, the fairing 230 may include selectively movable and lockable closures 232 for gaining access to the spar caps 50, 52 and trailing edge stringers 54, 56 at the connection joint 60.

Another exemplary embodiment of a connection joint 60b in accordance with aspects of the present invention is illustrated in FIGS. 16-19. Similar to previous embodiments, the connection joint 60b further includes a plurality of T-shaped slide members or cross pins 320 configured to be engaged with the eyes 90 of the connecting elements 62, and a plurality of fasteners 176 for coupling the cross pins 320 associated with the first blade section 22 to the cross pins 320 associated with the second blade segment 24. The cross pins 320 have a cross-sectional shape that generally matches the shape of the eyes 90 of the connecting elements 62. In this embodiment, the cross pins 320 include an elongate body 322 having generally planar top and bottom surfaces 324, 326, first and second generally planar side surfaces 328, 330, a generally arcuate first end surface 332, and a second end surface 334. The size of the cross pin 320 is such as to fit within the eyes 90 of the connecting elements 62. The first end surface 332 may be curved to generally correspond to the curvature of the first end 84 of the eyes 90. The second end surface 334 may be generally planar and correspond to a generally planar surface of the insert 88. Alternatively, however, the second end surface 274 may also be generally arcuate having, for example, a radius of curvature substantially equal to the radius of curvature of the first end surface 332. The first and second side surfaces 328, 330 include generally rectangular bosses 336, 338 extending therefrom and adjacent the top surface 324 (e.g., so as to be flush or planar therewith) so that the cross pin 320 is generally T-shaped. Each of the bosses 336, 338 includes a through bore 340 extending between first and second end surfaces of the bosses. Additionally, the second end surface 334 may further include a groove 342 adjacent the bottom surface 326 that extends across the end surface 334 in a direction generally transverse to a longitudinal direction of the cross pin 320. The groove 342 may be generally arcuate in cross section. In an exemplary embodiment, the cross pins 320 may be formed from metal, such as steel. However, other suitable materials may also be possible.

To facilitate a coupling between the first and second blade sections 22, 24, cross pins 320 may be inserted through the eyes 90 of the connecting elements 62 in the first blade section 22, either from exterior to interior or interior to exterior. The bosses 336, 338 extend outboard of the eyes 90 such that that portion of the cross pin 320 (e.g., the cross portion of the T) cannot pass through the eyes 90 and therefore engage an exterior or interior surface of the first blade section 22. In an exemplary embodiment, adjacent cross pins 320 in a chordwise direction of the blade section alternate in the orientation of the cross pins 320. Thus, the bosses 336, 338 of a cross pin 320 may engage the exterior surface of the blade section 22 while the bosses of an adjacent cross pin 320 engage the interior surface of the blade section 22, and vice versa. This alternating pattern is repeated along the chordwise direction on the first blade section 22 for the spar caps 50, 52 and/or the trailing edge stringers 54, 56.

In a similar manner, cross pins 320 may be inserted through the eyes 90 of the connecting elements 62 in the second blade section 24, either from exterior to interior or interior to exterior. The bosses 336, 338 extend outboard of the eyes 90 such that that portion of the cross pin 320 (e.g., the cross portion of the T) cannot pass through the eyes 90 and therefore engage an exterior or interior surface of the second blade section 24. In an exemplary embodiment, adjacent cross pins 320 in a chordwise direction of the blade section alternate in the orientation of the cross pins 320. Thus, the bosses 336, 338 of a cross pin 320 may engage the exterior surface of the blade section 24 while the bosses of an adjacent cross pin 320 engage the interior surface of the blade section 24, and vice versa. This alternating pattern is repeated along the chordwise direction on the second blade section 24. However, the alternating pattern in the first blade section 22 and the alternating pattern in the second blade section 24 are opposite to each other such that axially aligned cross pins 320 across the joint interface 26 have opposite orientations.

In this embodiment, the fasteners 176 include U-bolts 344 having a central portion 346 and opposed legs 348 with threaded ends 350 to secure the first and second blade sections 22, 24 together. In this regard, and with regard to a pair of axially aligned cross pins 320 and on an exterior side, the threaded ends 350 of a U-bolt 344 may be inserted through the bores 338 in the bosses 336, 338 of one of the cross pins 320 and the central portion 346 of the U-bolt 344 may be seated within the groove 342 in the other cross pin 320 axially aligned across the joint interface 26. Suitable nuts 352 may be threadably engaged with the threaded ends 350 of the U-shaped bolts 344 to secure the blade sections 22, 24 together. The same process may be used on the interior side of the connection joint 24b. Notably, however, the orientation of the U-bolt 344 on the interior side is opposite to that on the exterior side of the connection joint 24b. In other words, if a cross pin includes the threaded legs 348 and nuts 352 of a U-bolt on a first side of a connection joint 60, then the same cross pin includes the central portion 346 of a U-bolt on the other side of the connection joint. Thus for an aligned pair of cross pins 320 there is a symmetry that more evenly balances the forces. It is believed that the connection joint 24b not only provides a stronger joint between blade sections 22, 24, but the alternating arrangement provided by this embodiment also provides a more uniform distribution of the forces across the joint interface 26.

A hatch may be provided in the surface of the blade at or near the connection joint. This hatch, or opening, will allow a service technician to reach the fasteners on the outside of the blade from inside of the blade cavity. Hence, the technician does not have to be positioned outside of the blade to service or inspect the blade joint. This can avoid crane lifting or abseiling from the hub. The service hatch can be openable and closable from inside the blade. When the hatch is closed it can form part of the blade aerodynamic surface. The hatch can also be used to reach into the interior of the blade from the exterior of the blade.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. For example, while the invention has been described in terms of a stud bolt, the invention may be beneficial in applications using other types of bolts or elongated connectors, such as head bolts, etc. Thus, the various features of the invention may be used alone or in any combination depending on the needs and preferences of the user.

The invention claimed is:
1. A wind turbine rotor blade, comprising:
a first blade section having an upper shell half and a lower shell half that defines a suction side, pressure side, leading edge, and a trailing edge of the blade, the first blade section further including a first blade interface at one end of the first blade section;
a second blade section having an upper shell half and a lower shell half that defines a suction side, pressure side, leading edge, and a trailing edge of the blade, the second blade section further including a second blade interface at one end of the second blade section, wherein the first blade section and the second blade section are configured to be coupled together at the first and second blade interfaces; and
a connection joint for coupling the first and second blade sections together, the connection joint comprising a plurality of connecting elements integrated into the first and second blade sections at the first and second blade interfaces, each connecting element including an eye that defines at least in part a bore that extends from an exterior to an interior of one of the first or second blade sections,
wherein each of the first and second blade sections further include a first spar cap associated with the upper shell half and a second spar cap associated with the lower shell half, wherein the plurality of connecting elements includes a first set of connecting elements integrated into the first and second spar caps of the first and second blade sections, and
wherein each of the first and second spar caps is formed from pultruded strips of fiber.

2. The wind turbine rotor blade according to claim 1, wherein the first and second spar caps are integrated into the upper and lower shells such that the spar caps form part of an exterior surface of the first and second blade sections.

3. The wind turbine rotor blade according to claim 1, wherein a width of the first and second spar caps increases in a longitudinal direction toward the first and second blade interface of the first and second blade sections, respectively.

4. The wind turbine rotor blade according to claim 1, further comprising a first trailing edge stringer associated with the upper shell half and a second trailing edge stringer associated with the lower shell half of each of the first and second blade sections, wherein the plurality of connecting elements include a second set of plurality of connecting elements integrated into the first and second trailing edge stringers of the blade sections.

5. The wind turbine rotor blade according to claim 4, wherein the first and second trailing edge stringers are integrated into the upper and lower shells such that the trailing edge stringers form part of an exterior surface of the first and second blade sections.

6. The wind turbine rotor blade according to claim 4, wherein the trailing edge stringers are formed from pultruded strips of fiber.

7. The wind turbine rotor blade according to claim 1, wherein each of the plurality of connecting elements includes a folded roving of fibers, wherein the eye of the plurality of connecting elements is defined at least in part by the fold in the fiber rovings.

8. The wind turbine rotor blade according to claim 7, wherein the roving of fibers includes stacked plies of fiber material.

9. The wind turbine rotor blade according to claim 8, wherein substantially all of the stacked plies of fiber material include unidirectional fiber plies.

10. The wind turbine rotor blade according to claim 7, wherein the fibers include glass fibers, carbon fibers, or combinations thereof.

11. The wind turbine rotor blade according to claim 7, wherein at least a portion of the eyes of the plurality of connecting elements is formed by longitudinal side walls of the fiber rovings such that there are substantially no fiber endings at a boundary of the eyes along the portion formed by the fiber rovings.

12. The wind turbine rotor blade according to claim 1, wherein each of the plurality of connecting elements is made entirely from a composite material.

13. The wind turbine rotor blade according to claim 1, wherein each of the plurality of connecting elements is wedge shaped.

14. The wind turbine rotor blade according to claim 1, wherein the first and second blade sections are moulded and the plurality of connecting elements are integrated into the first and second blade sections during moulding of the blade sections.

15. The wind turbine rotor blade according to claim 1, further comprising a plurality of cross pins configured to be inserted through respective eyes of the plurality of connecting elements which form the bores through the first and second blade sections, wherein when the cross pins are received in the eyes, an exposed portion of the cross pins is configured to extend away from at least one of an exterior surface and an interior surface of the first and second blade sections.

16. The wind turbine rotor blade according to claim 15, wherein the cross pins are slidably insertable into respective eyes of the plurality of connecting elements and are not otherwise fixedly secured to the first and second blade sections.

17. The wind turbine rotor blade according to claim 15, wherein the cross pins include one or more grooves.

18. The wind turbine rotor blade according to claim 15, wherein the cross pins include a pair of opposed bosses to provide a T-shaped cross pin, wherein each of the bosses includes a through hole configured to receive a fastener.

19. The wind turbine rotor blade according to claim 15, further comprising a plurality of retention heads, wherein each retention head includes a through hole for receiving a fastener, and wherein each retention head is configured to abut a plurality of cross pins.

20. The wind turbine rotor blade according to claim 15, wherein the cross pins include a U-shaped bracket having a base and a pair of legs extending from the base and preferably further comprising a pair of shoes, wherein each leg of the U-shaped bracket includes a raised knuckle and each shoe includes a recess, and wherein the shoes are configured to engage with the legs such that the raised knuckle engages with the recess.

21. The wind turbine rotor blade according to claim 15, further comprising a plurality of fasteners for securing the first and second blade sections together at a joint interface.

22. The wind turbine rotor blade according to claim 21, wherein the fasteners are configured to engage with an exposed portion of the cross pins when the cross pins are received through respective eyes of the plurality of connecting elements.

23. The wind turbine rotor blade according to claim 21, wherein the plurality of fasteners include a plurality of U-bolts or stud bolts.

24. A method of making a wind turbine rotor blade section, comprising:
providing a moulding apparatus having a first mould half and a second mould half, each mould half including a moulding surface;
providing a plurality of connecting elements each having an eye;
laying a first assembly of fibers in the first and second mould halves of the moulding apparatus;
inserting the plurality of connecting elements in the first and second mould halves of the moulding apparatus;
laying a second assembly of fibers in the first and second mould halves of the moulding apparatus, wherein the plurality of connecting elements are generally positioned between the first and second assembly of fibers;
infusing resin into the first and second assemblies of fibers;
curing the fibers and resin to form upper and lower shells of the blade section, wherein the plurality of connecting elements is arranged in the first and second mould halves of the moulding apparatus such that the eyes in the connecting elements define bores through the upper and lower shells of the blade section; and
coupling the upper and lower shells together to form a blade section that defines a suction side, pressure side, leading edge, and a trailing edge of the blade section, the blade section further including a blade interface that includes the plurality of connecting elements.

25. The method according to claim 24, wherein laying the first and second assembly of fibers includes laying a first and second assembly of fibers that form a spar cap of the blade section, and wherein the plurality of connecting elements are inserted between the assembly of fibers that form the spar cap.

26. The method according to claim 24, wherein laying the first and second assembly of fibers includes laying a first and second assembly of fibers that form a trailing edge stringer of the blade section, and wherein the plurality of connecting elements are inserted between the assembly of fibers that form the trailing edge stringer.

27. The method according to claim 24, further comprising:
providing a plurality of anchors in the first and second mould halves of the moulding apparatus, the anchors coupled to the moulding surface and extending therefrom; and
supporting each of the connecting elements on a respective anchor such that the anchors extend through the eyes in the connecting elements.

28. A method of making a wind turbine blade, comprising:
forming a first blade section and a second blade section according to the method of claim 24;
inserting a plurality of cross pins through the eyes of the connecting elements in the first and second blade sections; and
using fasteners to couple exposed portions of the cross pins to each other across a joint interface at which the first and second blade sections meet.

29. A wind turbine, comprising:
a tower;
a nacelle positioned atop of the tower;
a rotor coupled to the nacelle and including at least one rotor blade including a first blade section and a second blade section coupled together by a connection joint, wherein the connection joint comprises:
a plurality of connecting elements integrated into the first and second blade sections, each connecting element including an eye that defines a bore through the blade sections;
a plurality of cross pins received through respective eyes of the plurality of connecting elements which form the bores in the blade sections, wherein the cross pins include an exposed portion that extends away from at least one of an external surface and an internal surface of the blade sections; and
a plurality of fasteners, each engaging the exposed portion of the cross pins across a joint interface at which the first and second blade sections meet for securing the first and second blade sections together.

* * * * *